(12) United States Patent
Donderici et al.

(10) Patent No.: US 10,605,072 B2
(45) Date of Patent: Mar. 31, 2020

(54) WELL RANGING APPARATUS, SYSTEMS, AND METHODS

(71) Applicant: Halliburton Energy Services, Inc., Houston, TX (US)

(72) Inventors: Burkay Donderici, Houston, TX (US); Hsu-Hsiang Wu, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/769,539

(22) PCT Filed: Aug. 4, 2015

(86) PCT No.: PCT/US2015/043621
§ 371 (c)(1),
(2) Date: Aug. 21, 2015

(87) PCT Pub. No.: WO2016/025245
PCT Pub. Date: Feb. 18, 2016

(65) Prior Publication Data
US 2016/0273343 A1    Sep. 22, 2016

Related U.S. Application Data

(60) Provisional application No. 62/078,732, filed on Nov. 12, 2014, provisional application No. 62/037,440, (Continued)

(51) Int. Cl.
*E21B 47/022* (2012.01)
*G01V 3/26* (2006.01)
(Continued)

(52) U.S. Cl.
CPC .......... *E21B 47/02216* (2013.01); *E21B 7/04* (2013.01); *E21B 33/14* (2013.01);
(Continued)

(58) Field of Classification Search
CPC ...... E21B 47/024; E21B 7/04; E21B 43/2406; E21B 33/14; E21B 47/12; E21B 47/122;
(Continued)

(56) References Cited

U.S. PATENT DOCUMENTS

| 4,372,398 A * | 2/1983 | Kuckes .................. E21B 47/02 166/66.5 |
| 4,443,762 A | 4/1984 | Kuckes |

(Continued)

FOREIGN PATENT DOCUMENTS

| WO | WO-2007/015087 A1 | 2/2007 |
| WO | WO-2012/134468 A1 | 10/2012 |

(Continued)

OTHER PUBLICATIONS

Koen, A Directional Borehole Radar System for Subsurface Imaging, 2002, p. 5-14.*

(Continued)

*Primary Examiner* — Lina M Cordero
(74) *Attorney, Agent, or Firm* — Gilliam IP PLLC

(57) ABSTRACT

Disclosed embodiments include well ranging apparatus, systems, and methods which operate to determine an approximate range between a drilling well and a target well using field equations and the set of measurements by repeatedly receiving the signals and determining the approximate range at increasing depths along the drilling well to build a model of current distribution along the target well, and when a comparison of a measurement predicted by the model to at least one component in the set of measurements indicates nonlinearity in the current distribution, inverting the approximate range to determine a model response that matches the set of measurements, using the model response in place of at least one component in the set of measurements, to determine an actual range to substitute for the (Continued)

approximate range. Additional apparatus, systems, and methods are disclosed.

20 Claims, 20 Drawing Sheets

Related U.S. Application Data filed on Aug. 14, 2014, provisional application No. 62/035,877, filed on Aug. 11, 2014.

(51) Int. Cl.

| | |
|---|---|
| E21B 7/04 | (2006.01) |
| E21B 33/14 | (2006.01) |
| E21B 47/024 | (2006.01) |
| G01V 99/00 | (2009.01) |
| G06F 17/11 | (2006.01) |
| E21B 43/24 | (2006.01) |
| E21B 47/12 | (2012.01) |
| E21B 47/18 | (2012.01) |

(52) U.S. Cl.
CPC ............. *E21B 47/024* (2013.01); *G01V 3/26* (2013.01); *G01V 99/005* (2013.01); *G06F 17/11* (2013.01); *E21B 43/2406* (2013.01); *E21B 47/12* (2013.01); *E21B 47/122* (2013.01); *E21B 47/18* (2013.01)

(58) Field of Classification Search
CPC ..... E21B 47/02216; E21B 47/18; G01V 3/26; G01V 99/005; G06F 17/11
USPC ......................................... 364/422
See application file for complete search history.

(56) References Cited

U.S. PATENT DOCUMENTS

| | | |
|---|---|---|
| 4,700,142 A | 10/1987 | Kuckes |
| 4,763,520 A | 8/1988 | Titchener et al. |
| 4,933,640 A | 6/1990 | Kuckes |
| 5,065,100 A | 11/1991 | Vail, III |
| 5,084,678 A | 1/1992 | Hutin |
| 5,189,415 A | 2/1993 | Shimada et al. |
| 5,230,387 A | 7/1993 | Waters et al. |
| 5,258,755 A | 11/1993 | Kuckes |
| 5,305,212 A | 4/1994 | Kuckes |
| 5,485,089 A | 1/1996 | Kuckes |
| 5,512,830 A | 4/1996 | Kuckes |
| 5,582,248 A | 12/1996 | Estes |
| 5,589,775 A | 12/1996 | Kuckes |
| 5,923,170 A | 7/1999 | Kuckes |
| 6,179,066 B1 | 1/2001 | Nasr et al. |
| 6,525,540 B1 | 2/2003 | Kong et al. |
| 6,985,814 B2 | 1/2006 | Mcelhinney |
| 7,268,552 B1 | 9/2007 | Gerald, II |
| 7,703,548 B2 | 4/2010 | Clark |
| 7,719,282 B2 | 5/2010 | Fanini et al. |
| 7,866,386 B2 | 1/2011 | Beer et al. |
| 7,962,287 B2 | 6/2011 | Clark |
| 7,969,819 B2 | 6/2011 | Hall et al. |
| 8,011,451 B2 | 9/2011 | MacDonald |
| 8,126,650 B2 * | 2/2012 | Lu .......................... G01V 3/083 166/250.01 |
| 8,237,443 B2 | 8/2012 | Hopmann et al. |
| 8,324,912 B2 | 12/2012 | Waid et al. |
| 8,462,012 B2 | 6/2013 | Clark et al. |
| 8,680,866 B2 | 3/2014 | Marsala et al. |
| 8,749,243 B2 | 6/2014 | Bittar et al. |
| 8,844,648 B2 | 9/2014 | Bittar et al. |
| 9,404,354 B2 | 8/2016 | Sugiura |
| 9,581,718 B2 | 2/2017 | Rodney |
| 9,702,240 B2 | 7/2017 | Bittar et al. |
| 2002/0000808 A1 | 1/2002 | Nichols |
| 2003/0137297 A1 | 7/2003 | Ganesan |
| 2004/0163443 A1 | 8/2004 | McElhinney |
| 2005/0218898 A1 | 10/2005 | Fredette et al. |
| 2006/0113112 A1 | 6/2006 | Waters |
| 2006/0131013 A1 * | 6/2006 | McElhinney ..... E21B 47/02216 166/250.01 |
| 2007/0126426 A1 | 6/2007 | Clark et al. |
| 2007/0187089 A1 | 8/2007 | Bridges |
| 2008/0000686 A1 | 1/2008 | Kuckes et al. |
| 2008/0177475 A1 * | 7/2008 | McElhinney ......... E21B 47/022 702/6 |
| 2008/0275648 A1 | 11/2008 | Illfelder |
| 2009/0164127 A1 | 6/2009 | Clark |
| 2009/0178850 A1 | 7/2009 | Waters et al. |
| 2009/0260878 A1 | 10/2009 | Morley et al. |
| 2009/0308657 A1 | 12/2009 | Clark et al. |
| 2010/0194395 A1 | 8/2010 | Mcelhinney |
| 2010/0300756 A1 | 12/2010 | Bergstrom et al. |
| 2010/0332137 A1 | 12/2010 | Meadows et al. |
| 2011/0015862 A1 | 1/2011 | Sato et al. |
| 2011/0018542 A1 | 1/2011 | Clark et al. |
| 2011/0088890 A1 | 4/2011 | Clark |
| 2011/0284731 A1 | 11/2011 | Roscoe et al. |
| 2011/0290011 A1 | 12/2011 | Dowla et al. |
| 2011/0308794 A1 | 12/2011 | Bittar et al. |
| 2011/0308859 A1 | 12/2011 | Bittar et al. |
| 2011/0309836 A1 | 12/2011 | Bittar et al. |
| 2012/0001637 A1 | 1/2012 | Bittar et al. |
| 2012/0013339 A1 | 1/2012 | Kuckes et al. |
| 2012/0109527 A1 | 5/2012 | Bespalov et al. |
| 2012/0139543 A1 | 6/2012 | McElhinney et al. |
| 2012/0158305 A1 * | 6/2012 | Rodney .................. G01V 3/26 702/6 |
| 2012/0257475 A1 | 10/2012 | Luscombe et al. |
| 2012/0273192 A1 | 11/2012 | Schmidt et al. |
| 2012/0283951 A1 | 11/2012 | Li et al. |
| 2012/0283952 A1 | 11/2012 | Tang et al. |
| 2013/0056272 A1 | 3/2013 | Kuckes |
| 2013/0068526 A1 | 3/2013 | Snyder et al. |
| 2013/0069655 A1 | 3/2013 | McElhinney et al. |
| 2013/0151158 A1 | 6/2013 | Brooks et al. |
| 2013/0173164 A1 | 7/2013 | Zhang |
| 2013/0184995 A1 * | 7/2013 | Sinclair .................. G01V 99/00 702/9 |
| 2013/0333946 A1 | 12/2013 | Sugiura |
| 2014/0132272 A1 * | 5/2014 | Cuevas .................... G01V 3/38 324/355 |
| 2014/0145857 A1 | 5/2014 | Comparetto |
| 2014/0191120 A1 | 7/2014 | Donderici et al. |
| 2014/0374159 A1 | 12/2014 | McElhinney et al. |
| 2015/0013968 A1 | 1/2015 | Hsu et al. |
| 2015/0124562 A1 | 5/2015 | Yoneshima et al. |
| 2015/0240623 A1 | 8/2015 | Blange et al. |
| 2015/0361789 A1 | 12/2015 | Donderici et al. |
| 2015/0378044 A1 * | 12/2015 | Brooks .................. G01P 15/00 702/9 |
| 2016/0216396 A1 | 7/2016 | Golla et al. |
| 2016/0258275 A1 | 9/2016 | Wu et al. |
| 2016/0258276 A1 * | 9/2016 | Donderici ......... E21B 47/02216 |
| 2016/0273338 A1 | 9/2016 | Wu |
| 2016/0273339 A1 | 9/2016 | Wu |
| 2016/0273340 A1 | 9/2016 | Roberson et al. |
| 2016/0273341 A1 | 9/2016 | Wu et al. |
| 2016/0273342 A1 | 9/2016 | Wu et al. |
| 2016/0273344 A1 | 9/2016 | Wu et al. |

FOREIGN PATENT DOCUMENTS

| | | |
|---|---|---|
| WO | WO-2013/162505 A1 | 10/2013 |
| WO | WO-2014/089402 A2 | 6/2014 |
| WO | 2016025230 A1 | 2/2016 |
| WO | 2016025232 A1 | 2/2016 |
| WO | 2016025235 A1 | 2/2016 |
| WO | 2016025237 A1 | 2/2016 |
| WO | 2016025238 A1 | 2/2016 |

(56) References Cited

FOREIGN PATENT DOCUMENTS

| WO | 2016025241 A1 | 2/2016 |
|----|---------------|--------|
| WO | 2016025245 A1 | 2/2016 |
| WO | 2016025247 A1 | 2/2016 |

OTHER PUBLICATIONS

"International Application Serial No. PCT/US2015/043621, International Search Report dated Oct. 19, 2015", 3 pgs.
"International Application Serial No. PCT/US2015/043621, Written Opinion dated Oct. 19, 2015", 5 pgs.
Definition of well head accessed through Schlumberger Oilfield Glossary on Nov. 15, 2016 via http://www.glossary.oilfield.slb.com/Terms/w/wellhead.aspx, 2 pages.
Definition of cement accessed through Schlumberger Oilfield Glossary on Nov. 15, 2016 via http://www.glossary.oilfield.slb.com/Terms/c/cement.aspx, 3 pages.
"International Application Serial No. PCT/US2015/043557, International Search Report dated Oct. 19, 2015", 3 pgs.
"International Application Serial No. PCT/US2015/043557, Written Opinion dated Oct. 19, 2015", 5 pgs.
"International Application Serial No. PCT/US2015/043566, International Search Report dated Oct. 26, 2015", 3 pgs.
"International Application Serial No. PCT/US2015/043566, Written Opinion dated Oct. 26, 2015", 11 pgs.
"International Application Serial No. PCT/US2015/043577, International Search Report dated Oct. 21, 2015", 3 pgs.
"International Application Serial No. PCT/US2015/043577, Written Opinion dated Oct. 21, 2015", 9 pgs.
"International Application Serial No. PCT/US2015/043580, International Search Report dated Nov. 11, 2015", 3 pgs.
"International Application Serial No. PCT/US2015/043580, Written Opinion dated Nov. 11, 2015", 9 pgs.
"International Application Serial No. PCT/US2015/043587, International Search Report dated Oct. 26, 2015", 3 pgs.
"International Application Serial No. PCT/US2015/043587, Written Opinion dated Oct. 26, 2015", 11 pgs.
"International Application Serial No. PCT/US2015/043604, International Search Report dated Oct. 28, 2015", 3 pgs.
"International Application Serial No. PCT/US2015/043604, Written Opinion dated Oct. 28, 2015", 14 pgs.
"International Application Serial No. PCT/US2015/043639, International Search Report dated Oct. 27, 2015", 3 pgs.
"International Application Serial No. PCT/US2015/043639, Written Opinion dated Oct. 27, 2015", 10 pgs.
CA Application Serial No. 2,954,301, Office Action 3, dated Mar. 1, 2019, 5 pages.
CA Application Serial No. 2,954,668, Office Action, dated Mar. 5, 2019, 5 pages.
CA Application Serial No. 2,954,657; Examiner's Letter; dated Dec. 5, 2017, 3 pages.
CA Application Serial No. 2,954,668; Examiner's Letter; dated Dec. 12, 2017, 5 pages.
GCC Application Serial No. 2015/29861, GCC Examination Report; dated Jan. 23, 2018, 5 pages.
GCC Application Serial No. 2015/29864, GCC Examination Report; dated Nov. 22, 2018, 5 pages.
CA Application Serial No. 2954674, Examinees Letter, dated Dec. 12, 2017, 3 pages.
CA Application Serial No. 2954723, First Exam Report, dated Dec. 5, 2017, 3 Pages.
CA Application Serial No. 2954726, Examiner's Letter, dated Dec. 12, 2017, 3 pages.
GCC Application Serial No. 2015/29856; Second Examination Report; dated Jun. 24, 2018, 3 pages.
GCC Application Serial No. 2015/29857; Second Examination Report; dated Jun. 24, 2018, 3 pages.
GCC Application Serial No. 2015/29873; Second Examination Report; dated Jun. 24, 2018, 3 pages.
CA Application Serial No. 2,954,657; Examiner's Letter; dated Jun. 5, 2018, 4 pages.
CA Application Serial No. 2,954,668; Examiner's Letter; dated Jun. 6, 2018, 4 pages.
GCC Application Serial No. 2015/29857; GCC Examination Report; dated Jan. 23, 2018, 4 pages.
GCC Application Serial No. 2015/29856, GCC Examination Report; dated Jan. 23, 2018, 4 pages.
GCC Application Serial No. 2015/29871; 2nd Examination Letter: dated Aug. 30, 2018, 4 pages.
GCC Application Serial No. 2015/29872; Examination Report; dated Nov. 22, 2018, 4 pages.
GCC Application Serial No. 2015/29874; Second Examination Report; dated Jun. 24, 2018, 4 pages.
CA Application Serial No. 2954303, First Exam Report, dated Nov. 29, 2017, 5 pages.
CA Application Serial No. 2954666, First Exam Report, dated Dec. 12, 2017, 5 pages.
CA Application No. 2,954,666; Examiner's Letter; dated Apr. 17, 2019, 5 pages.
CA Application Serial No. 2,954,303; Examiner's Letter; dated Apr. 24, 2019, 5 pages.
CA Application Serial No. 2,954,303; Examiner's Letter; dated Jul. 24, 2018, 5 pages.
GCC Application Serial No. 2015/29871, GCC Examination Report, dated Feb. 28, 2018, 5 pages.
CA Application Serial No. 2,954,301; First Examiner's Letter; dated Nov. 29, 2017, 6 pages.
CA Application No. 2,954,666; Examiner's Letter; dated Jul. 30, 2018, 5 pages.
CA Application Serial No. 2,954,301; Examiner's Letter; dated Jun. 1, 2018, 6 pages.
GCC Application Serial No. 2015/29874; GCC Examination Report; dated Jan. 23, 2018, 6 pages.
GCC Application Serial No. 2015/29873; GCC Examination Report; dated Feb. 8, 2018, 8 pages.
U.S. Appl. No. 14/769,548; Non-Final Office Action; dated Mar. 11, 2019, 30 pages.
U.S. Appl. No. 14/769,512; Final Office Action; dated May 3, 2019, 19 pages.
U.S. Appl. No. 14/769,533; Non-Final Office Action; dated Apr. 26, 2019, 33 pages.
U.S. Appl. No. 14/769,548, Final Office Action, dated Jun. 27, 2019, 30 pages.
U.S. Appl. No. 15/666,137, Non-Final Office Action, dated Jun. 24, 2019, 6 pages.
U.S. Appl. No. 14/769,548, Notice of Allowance, dated Oct. 30, 2019, 17 pages.
U.S. Appl. No. 14/769,512, Notice of Allowance, dated Aug. 14, 2019, 9 pages.

* cited by examiner

WELL RANGING APPARATUS, SYSTEMS, AND METHODS

CROSS-REFERENCE TO RELATED APPLICATIONS

The present application is a U.S. National Stage Filing under 35 U.S.C. 371 from International Application No. PCT/US2015/043621, filed on 4 .Aug. 2015, which application claims the benefit of priority to provisional application Ser. No. 62/035,877, filed Aug. 11, 2014; provisional application Ser. No. 62/037,440, filed Aug. 14, 2014; and provisional application Ser. No. 62/078,732, filed Nov. 12, 2014; each of which is incorporated herein by reference in its entirely.

BACKGROUND

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" or "access-dependent ranging" in which an electromagnetic source is located in the existing well and monitored via sensors on the drill string in the well under construction. Another technique involves systems that locate both the source and the sensor(s) on the drill string—relying on backscatter transmission from the target well to determine the range between the drilling well and the target well. These latter systems are sometimes called "passive ranging" or "access-independent" systems by those of ordinary skill in the art. In either case, the ranging techniques are sometimes limited in the degree of accuracy that can be obtained.

DETAILED DESCRIPTION

Introduction

Magnetic ranging has been widely used for various applications, including well intersection, well avoidance, SAGD, and others. One excitation method for magnetic ranging is surface excitation. Surface excitation is a popular method of generating a ranging signal. It is relatively easy to implement, without the need for complex cabling and equipment. When surface excitation is used, a current is injected into a target well casing at the surface of the well (e.g., at the well head). The current travels along the casing down-hole and generates a magnetic field down-hole that originates from the target via direct transmission, and can be measured at a distance (e.g., in a drilling well) for ranging purposes. As a result, the excitation signal down-hole may be relatively weak when the distance beneath the surface is great, due to the current leakage into the conductive formation. Consequently, sensor noise often affects magnetic ranging accuracy at greater depths, leading to false signal measurements and failures in well location. Some of the embodiments described herein are designed to improve down-hole current strength and/or enhance the signal/noise ratio, for improved accuracy with respect to ranging measurement technology.

Such apparatus, methods, and systems can be even more useful when backscatter ranging is used: that is, when the excitation source is injected into the casing of the drilling well, or is attached to a drill string within the drilling well. In the case of backscatter ranging, the excitation source originates a direct transmission signal that impinges upon, and is then reflected from, the target well. When these backscatter transmission signals are received at a receiver in the drilling well, the resulting received ranging signals are even weaker than in the direct transmission case.

Thus, novel apparatus, methods, and systems are proposed to increase the strength of the received ranging signal, to improve the received signal-to-noise ratio (SNR), and to improve the accuracy of ranging signal measurements. In some embodiments, enhancements are realized in all three of these areas. By taking this approach, ranging system technology can be improved in a number of ways, via improved accuracy and reliability of individual ranging measurements. Therefore, the apparatus, methods, and systems proposed herein can be used to reduce measurement issues that arise due to noise, as well as to generate larger signals at great depths. The result is that the maximum detection ranges for existing ranging systems can be significantly improved. In some embodiments, the apparatus, methods, and systems described herein can be applied to electromagnetic (EM) telemetry applications.

Figure 1:
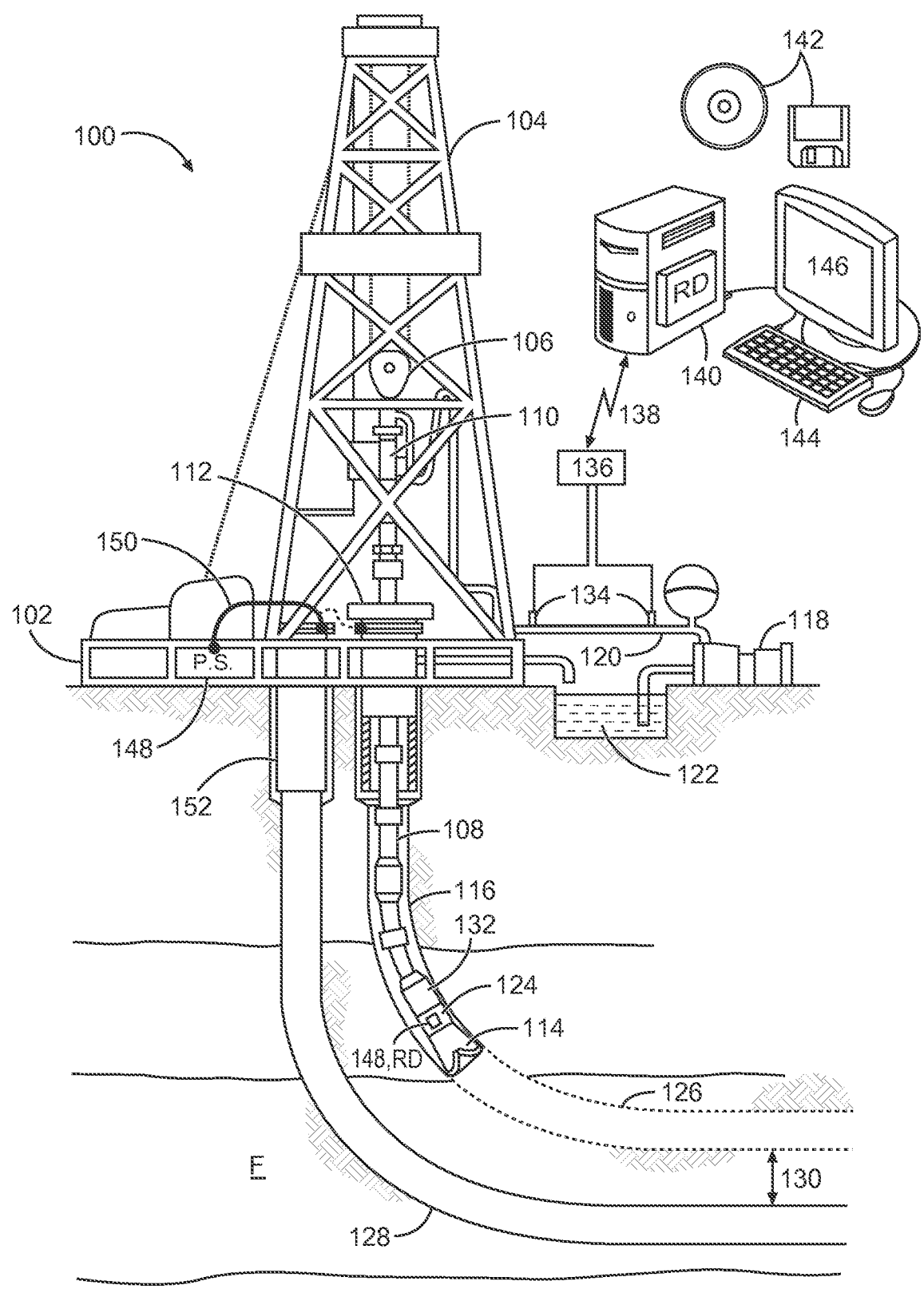
FIG. 1 depicts an example drilling environment in which ranging embodiments may be employed.

FIG. 1 depicts an example drilling environment 100 in which ranging embodiments may be employed. The disclosed apparatus (e.g., logging tools), systems, and methods are best understood in the context of the larger systems in which they operate. Accordingly, FIG. 1 illustrates an example drilling environment 100 in which a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a borehole 116 that passes through various formations F. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the borehole into the retention pit 122 and aids in maintaining the borehole integrity.

The drill bit 114 is just one piece of a bottom-hole assembly (BHA) that includes one or more drill collars (comprising thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (also known as rotational or azimuthal orientation), an inclination angle (the slope), and a compass direction, each of which can be derived from measurements made by magnetometers, inclinometers, and/or accelerometers, though other sensor types such as gyroscopes may also be used. In one specific embodiment, the tool includes a three-axis fluxgate magnetometer and a three-axis accelerometer. As is known in the art, the combination of these two sensor systems enables the measurement of the tool face angle, inclination angle, and compass direction. In some embodiments, the tool face and hole inclination angles are calculated from the accelerometer sensor output, and the magnetometer sensor outputs are used to calculate the compass direction.

The BHA further includes a ranging tool 124 to receive signals from current injected by a power supply 148 into nearby conductors such as pipes, casing strings, and conductive formations and to collect measurements of the resulting field to determine distance and direction. Using measurements of these signals, in combination with the tool orientation measurements, the driller can, for example, steer the drill bit 114 along a desired path in the drilling well 126 relative to the existing well (e.g., target well) 128 in formation F using any one of various suitable directional drilling systems, including steering vanes, a "bent sub", and a rotary steerable system. For precision steering, the steering vanes may be the most useful steering mechanism. The steering mechanism can be controlled from the Earth's surface, or downhole, with a downhole controller programmed to follow the existing borehole 128 at a predetermined distance 130 and position (e.g., directly above or below the existing borehole).

The ranging tool 124 may comprise one or more elements, interchangeably designated as receivers or sensors in this document. These elements may comprise uniaxial, biaxial, or triaxial magnetometers, coil antennas, and/or telemetry receivers.

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. Note that other forms of telemetry exist and may be used to communicate signals from downhole to the digitizer. Such telemetry may include acoustic telemetry, electromagnetic telemetry, or telemetry via wired drill pipe.

The digitizer 136 supplies a digital form of the telemetry signals via a communications link 138 to a computer 140 or some other form of a data processing device. The computer 140 operates in accordance with software (which may be stored on non-transitory information storage media 142) and user input provided via an input device 144 to process and decode the received signals. The resulting telemetry data may be further analyzed and processed by the computer 140 to generate a display of useful information on a computer monitor 146 or some other form of a display device. For example, a driller could employ this system to obtain and monitor drilling parameters, formation properties, and the path of the borehole relative to the existing borehole 128 and any detected formation boundaries. A downlink channel can then be used to transmit steering commands from the surface to the BHA. In some embodiments, the computer 140 has analog circuitry installed or is programmed to include a ranging determination module RD, which operates on the signal data received down hole at the ranging tool 124 to determine the distance and direction from the drilling well 126 to the target well 128. The ranging determination module RD may exist in the computer 140 or the tool 124, and may be used to implement any of the methods described herein.

Thus, FIG. 1 illustrates an electromagnetic ranging system with surface excitation. The power supply 148 at the surface employs a cable 150 to inject current into target well casing 152 and flowing down-hole so that magnetic fields can be generated surrounding a target well 128. Then sensors in the ranging tool 124 in the drilling well 126 can determine the magnetic field strength in various directions so that distance and direction between the target well 128 and drilling well 126 can be determined. The power supply 148 can also be connected to inject current into the casing of the drilling well 126, or be disposed downhole in either the drilling well 126 (shown) or the target well 128 (not shown in this figure).

The drilling well 126 and the target well 128 are often constructed as a cased hole, with cement installed around the outside of the casing material (e.g., conductive piping). In the completion phase of oil and gas wells, the cement serves to isolate the wellbore, helps prevent casing failure, and keeps the wellbore fluids from contaminating freshwater aquifers.

Standard ranging calculations assume an infinite line current source is provided by the target well, which is not valid when sensors approach the end of the target well pipe. Indeed, the current source ends abruptly with the end of the pipe, which dramatically affects ranging results that depend on the assumption of a constant current source. Moreover, current leaks into the formation along the length of the target well, degrading with distance. These environmental conditions create errors in ranging calculations when the aforementioned current flow assumptions carry over into the field, and the error increases as the end of the pipe is approached.

As a solution to this technical problem, and to obtain greater accuracy, conventional current flow assumptions may be utilized at shallow depths, and in the near distance (between drilling and target wells). Measurements are made in these conditions that approach the ideal, where the target well depth and sensor depth are known, and when the well separation distance is not large. Thus, range calculations in these locations can be made using conventional equations.

However, as the depth and range between wells increase, various embodiments operate so that the accumulated data can be used to produce a model of the measurements that match what has been acquired in shallow depths. This model can be put in place once the received current distribution along the target well becomes nonlinear (e.g., when the depth is about 200 m to the end of the pipe in the target well). The model includes formation properties, pipe properties, and distance to the end of the pipe in the target well, among other components.

Thus, In the following paragraphs, apparatus, methods, and systems are described that operate to reduce the end of pipe effect on ranging performance. End of pipe profiles are modeled, with mathematical inversion provided to improve ranging measurement performance when sensors attempt to measure field strength close to the end of a target well, which acts as a non-uniform current source.

Detailed Presentation

In surface excitation applications, an excitation current may be injected into a target well, with sensors located in a drilling well, perhaps in the BHA. Thus, sensors are utilized to detect the signals generated by the target well current and thereafter determine the relative ranging distance and direction between the target well and the drilling well.

Conventional ranging calculations are based on the assumption of a uniform infinite current source. This assumption may be sufficient for some applications, because the desired ranging distance (e.g., 5-30 m, depending on the application) is small, compared to the distance that the excitation current travels in the target well (e.g., more than 500 m). In other words, the ranging distance is less than 5% of the distance the excitation current travels. However, as the ranging sensors approach the end of the target well, the current in the target well leaks significantly, dropping precipitously, in a non-linear fashion. Consequently, the assumption of uniform, infinite current fails near the end of the target well pipe, due to the end effect of the pipe in the target well. As a result, ranging distance determination becomes inaccurate when using conventional ranging calculations.

The apparatus, methods, and systems described herein address the end pipe effect for ranging applications. Ranging planner modeling is used to consider the end pipe effect and assist in determining the ranging distance.

In some embodiments, the ranging planner begins by building a model in close proximity to the target well, using real target well conditions based on conventional ranging calculations at shallow depths. Afterward, the ranging planner operates to update the model that has been built, using accumulated data and conventional ranging calculations.

Once the conventional assumptions begin to fail, as determined via ranging planner modeling and the approach of the end of the target well, the ranging planner will switch over to using the most recent version of the model (which can be updated to include the most recent real, acquired data) to determine the ranging distance, instead of using conventional ranging calculations. A robust inversion code can be used together with the ranging planner model to improve ranging distance determination.

FIGS. 2 to 10 illustrate a variety of apparatus, method, and system configurations for various range determination embodiments. These include ranging methods based on the assumption of a uniform, infinite current source.

Figure 2:
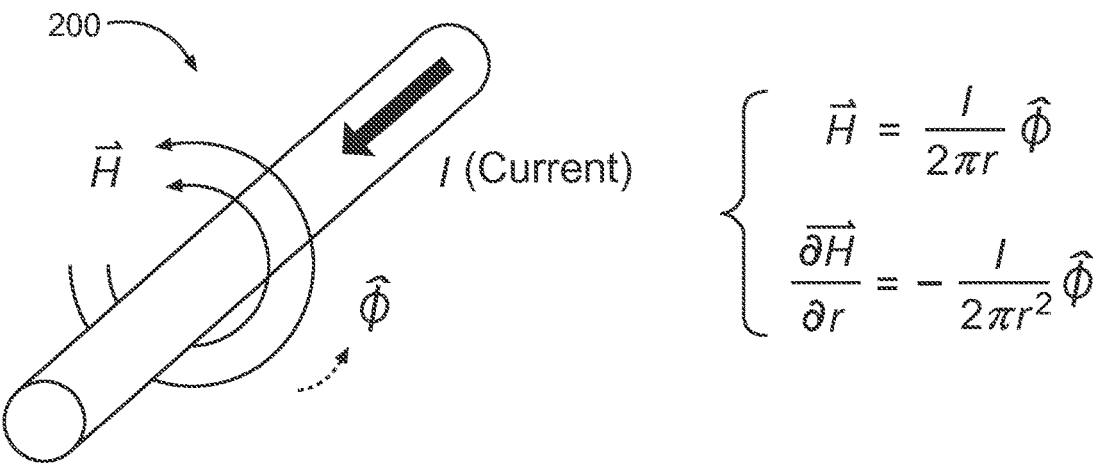
FIGS. 2 to 10 illustrate a variety of apparatus, method, and system configurations for various range determination embodiments.

More particularly, FIG. 2 shows an infinite line source with a constant current I. Based on Ampere's law, the magnetic field H at low frequency surrounding the line source can be expressed as $$\bar{H} = \frac{I}{2\pi r}\hat{\Phi}, \quad (1)$$

where r is the distance between an observation point and the infinite line source.

In addition, the gradient field can be given by:

$$\frac{\partial \bar{H}}{\partial r} = -\frac{I}{2\pi r^2}\hat{\Phi}. \quad (2)$$

Consequently, the distance r can be directly computed by taking ratio of amplitude of Equation (1) to the amplitude of Equation (2), given by $$\left|\frac{\bar{H}}{\frac{\partial \bar{H}}{\partial r}}\right| = \left|\frac{\frac{I}{2\pi r}}{\frac{-I}{2\pi r^2}}\right| = r. \quad (3)$$

The Ranging Planner

Figure 3:
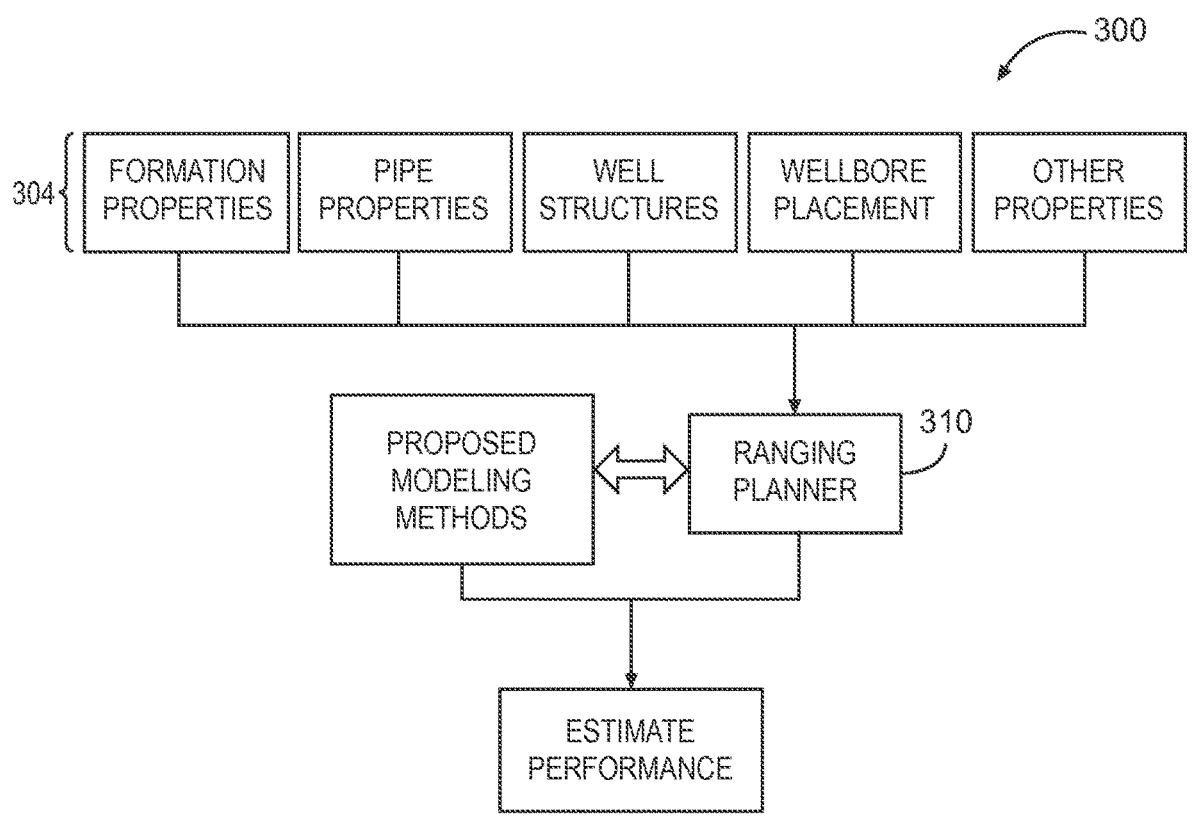

The ranging planner operational processing flow diagram 300 is shown in FIG. 3. Here it can be seen that the ranging planner 310 utilizes robust modeling to estimate current distribution along the target well. The estimate is based on the surface excitation and the corresponding magnetic field strength around the target well. The ranging planner 310 thus makes use of several input values 304, including: formation properties (can be estimated from resistivity logs of offset wells and/or the target well), pipe properties (can be estimated from pipe vendor datasheets), detailed well structures (including mud properties, cement properties, and pipe dimensions), wellbore placement, and other environmental properties (such as temperature), to enable the modeling simulation.

In practice, some of the input values 304 for the ranging planner 310 may not be accurate or available. Therefore, related modeling responses may be offset and/or different from real sensor measurements. Consequently, the conventional ranging calculation shown in Equation (3) will be used in most embodiments for ranging distance determination at relatively shallow depths, and the calculated results will be accumulated and updated for presentation to the ranging planner 310. The ranging planner 310 can use the sensor measurements and calculations provided by Equation (3) to adjust input parameters (e.g., such as a change in pipe conductivity) so that a better model can be obtained. The ranging planner 310 will continue to update the model until the conventional ranging calculation fails, which typically occurs when sensors approach the end of the target well. This point is often reached about 200 m from the actual end of the target well.

Figure 4:
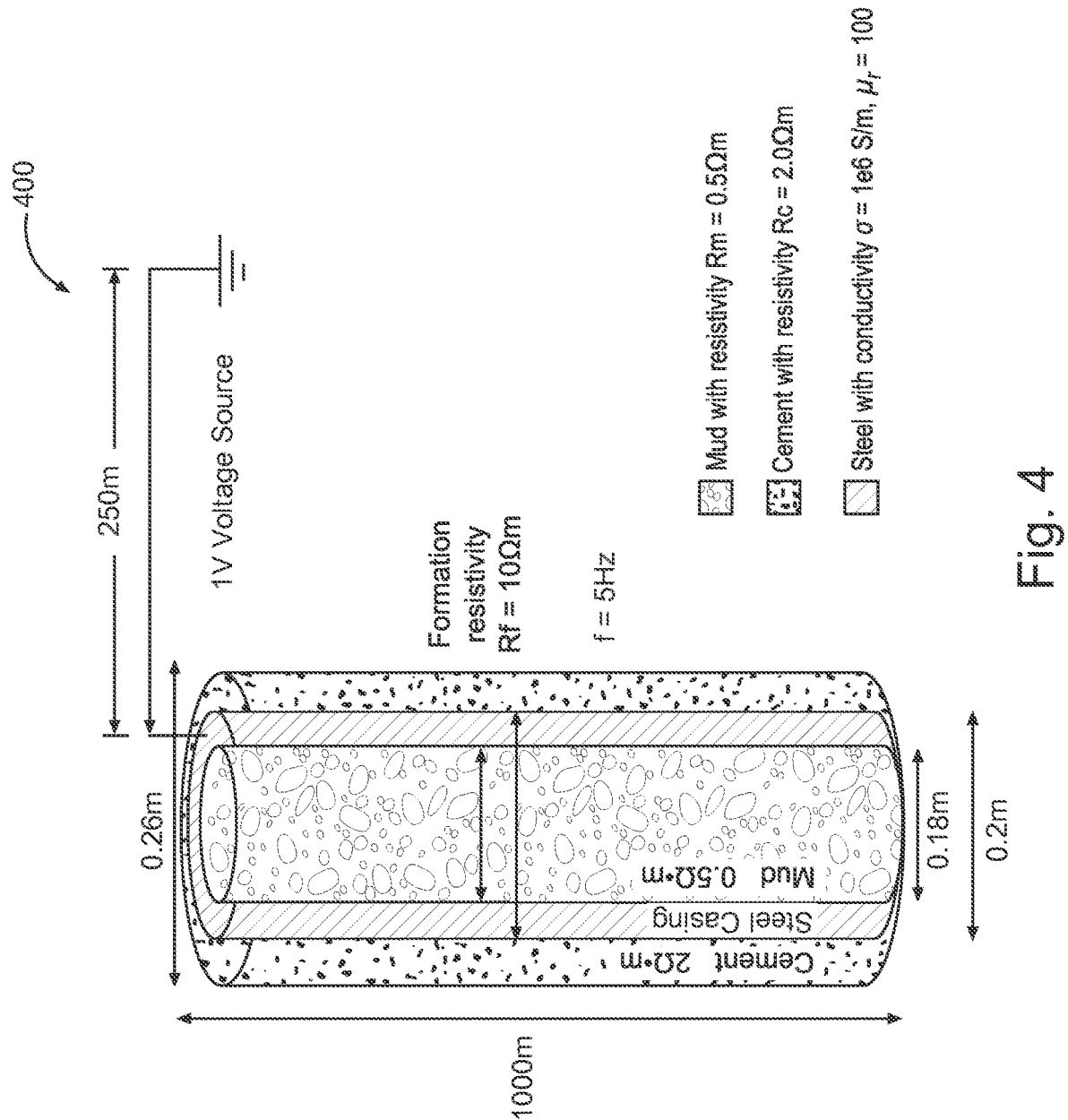

In some embodiments then, the ranging planner is used to estimate the range at depth, where nonlinear target well current distribution occurs. For example, FIG. 4 illustrates a model of the target well 400 that can be used in the ranging planner 310 of FIG. 3 to simulate ranging current responses. With a variety of input parameters defined in FIG. 4, the ranging planner model can thus operate to simulate the current distribution in the target well 400.

Figure 5:
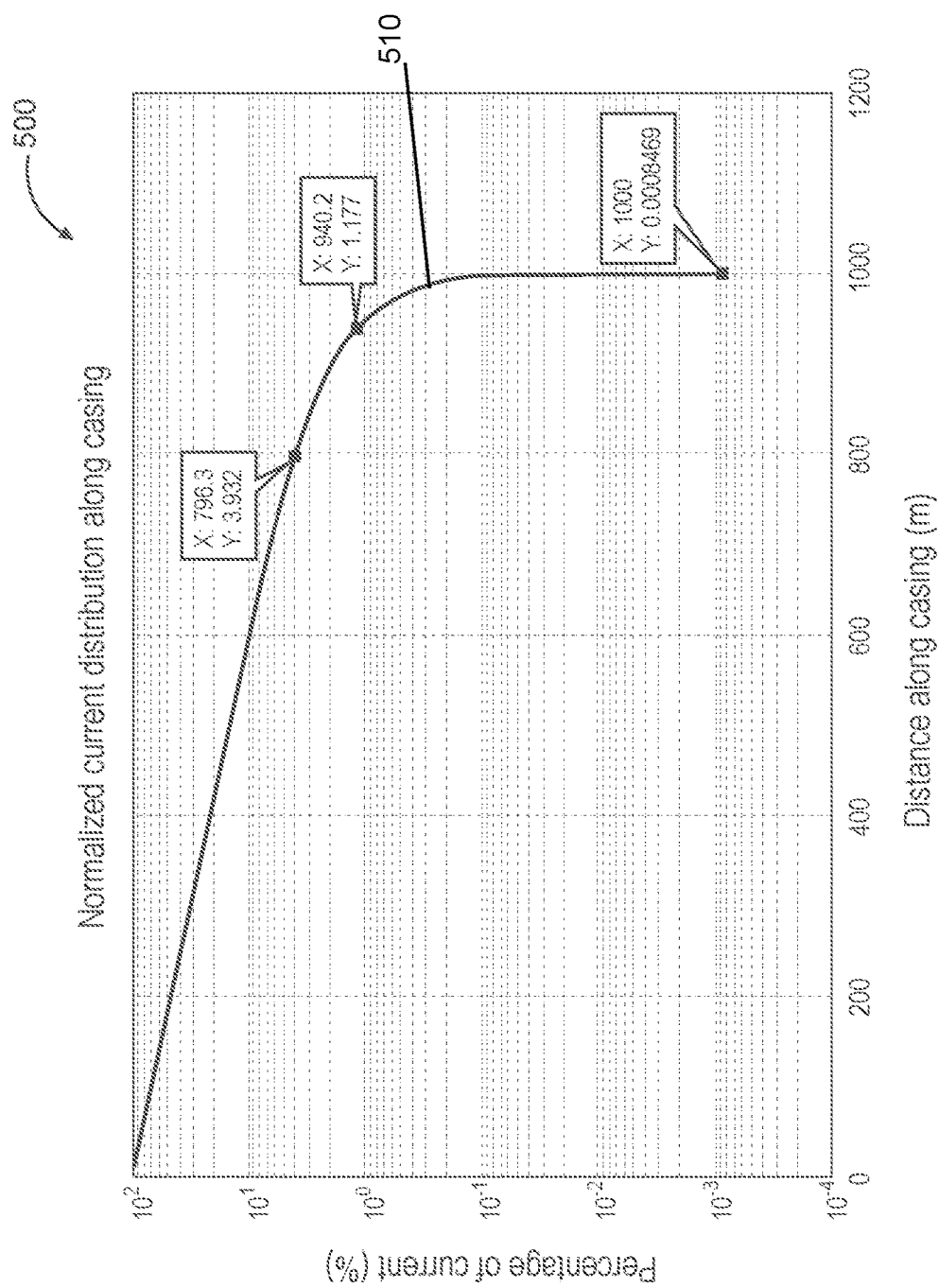

The modeling response provided by the ranging planner is shown in the graph 500 of FIG. 5. Here the response 510 represents the normalized current distribution along the target well, according to the parameters shown for the model of the target well 400 in FIG. 4. The normalized current distribution, as the response 510, is the ratio of the calculated current at each depth to the surface current at the wellhead of the target well.

As can be seen in FIG. 5, the current distribution response 510 is substantially linear before a measured depth of 940 m. However, after about 940 m, the injected current degrades, due to the end of pipe effect, so that nonlinear current distribution is observed. At this depth (roughly 950 m-1000 m), the conventional ranging calculation shown in Equation (3) becomes inaccurate. Thus, at this point, instead of relying on conventional current distribution assumptions, the ranging planner operates to provide modeling responses of the magnetic field surrounding the target well, based on the given model.

Table I shows an example of the modeling field responses surrounding the target well 400 of FIG. 4, at three different measured depths and three different ranging distances. The field responses, as a magnetic field strength, are normalized by the current amplitude of the surface excitation, which can be measured at the surface from the power supply system. Using the modeling capabilities of the ranging planner, the ranging distance can be directly determined by comparing the sensor measurements with the modeling responses in Table I. A robust inversion method or a linear interpolation method can then be used to determine the ranging distance that produces the modeling responses matching the sensor measurements at a specific depth.

TABLE I

| Measured Depth (m) | Distance between sensor and target well (m) | Corresponding magnetic field strength (A/m) normalized by surface current (A) |
|---|---|---|
| 799.9283 | 5 | 7.594115E−04 |
| 799.9283 | 5.05 | 7.519060E−04 |
| 799.9283 | 5.1 | 7.445478E−04 |
| 810.9079 | 5 | 7.140296E−04 |
| 810.9079 | 5.05 | 7.069728E−04 |
| 810.9079 | 5.1 | 7.000545E−04 |
| −820.667 | 5 | 6.745488E−04 |
| −820.667 | 5.05 | 6.678824E−04 |
| −820.667 | 5.1 | 6.613468E−04 |

Figure 6:
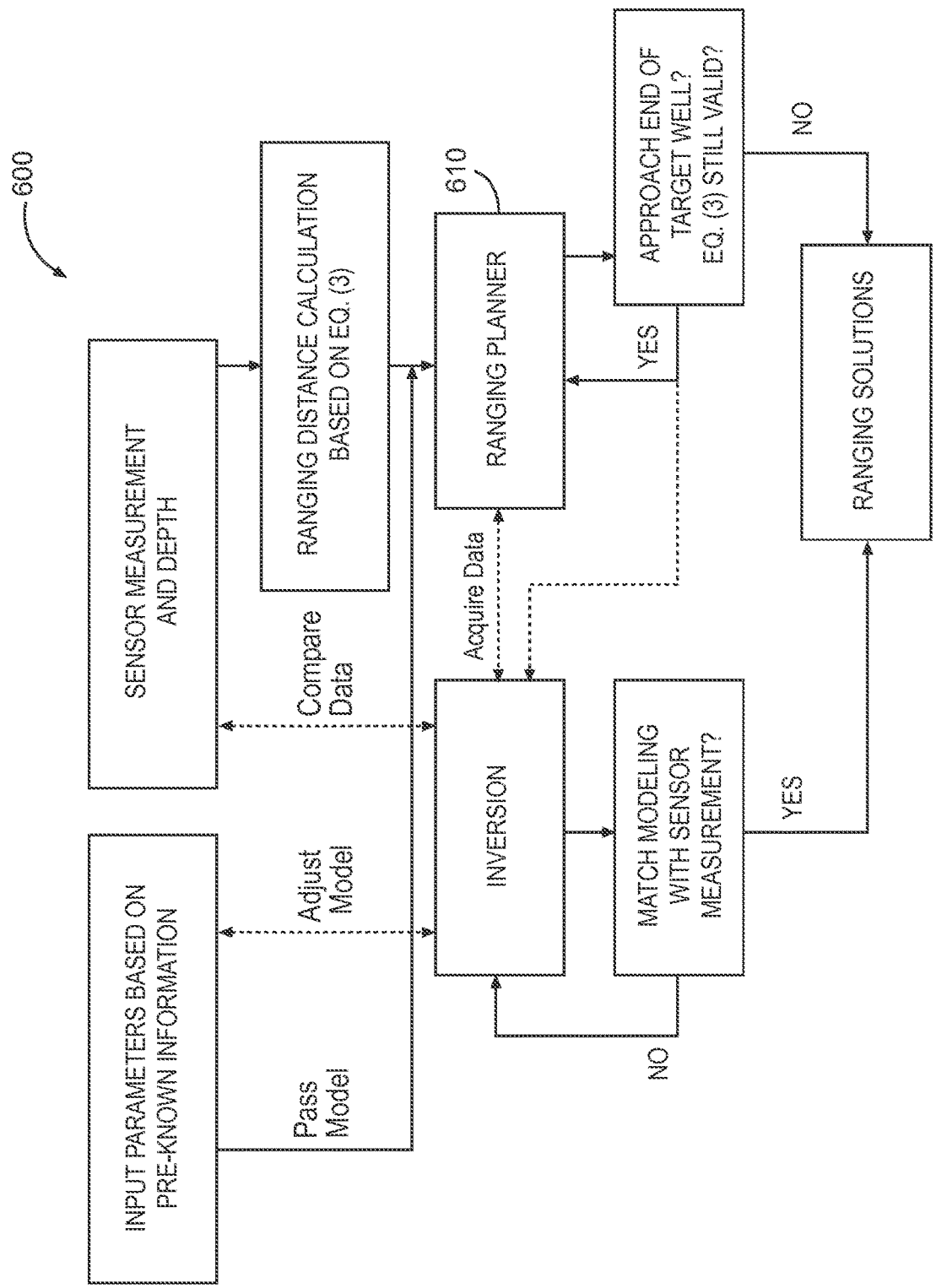

FIG. 6 is a flow diagram for some of the processing methods proposed herein, including a ranging planner algorithm 600. Thus, before operating the tool downhole for ranging applications, some pre-existing (i.e., known) information can be provided by the field operator as input parameters to the algorithm executed by the ranging planner (refer to the ranging planner 310 in FIG. 3). If measurement information is not available, the best estimate can be entered. Afterward, during operation, the ranging sensors will be used to take measurements at different depths downhole. The information obtained by the ranging sensors can then be used to calculate the ranging distance using Equation (3).

Using the ranging planner algorithm 600, one can determine when the sensors are approaching the end of the target well, or some depth where nonlinear current distribution occurs in the target well. Thus, if Equation (3) is still valid based on the solutions provided by the ranging planner 610, then the ranging solutions (including ranging distance, current distribution of the target well, and the currently-built model) will be made available to the field operator. However, if Equation (3) is no longer valid due to the sensors encountering the end of pipe effect (i.e., the field strength measured by the sensors indicates that the actual current distribution has become non-linear), the ranging planner 610 will operate to use an inversion with all accumulated measurements and valid calculations. The inversion will operate to adjust the input parameters to create a model with modeling responses that match the actual measurements.

Once the model is defined, on the basis of the accumulated measurements and calculations, the inversion will be used to calculate the corresponding ranging distance, similar to what has been shown in the modeling data in Table I. The best fit between sensor field measurements and modeling output data will then be used to determine the actual ranging distance between the sensors and the target well.

At this point, the ranging solutions will be provided as output from the inversion activity. In some embodiments, the inversion activity begins prior to indications of non-linearity, at a shallow depth. The inversion result may be easier to calculate than near the end of pipe/casing, but the inversion calculation will likely take longer than using the conventional ranging calculations of Equation (3).

In applications with EM signals traveling within a pipe, it is useful to estimate the signal strength of the signals at different positions along the pipe. The signal strength may vary due to different formation properties, different casing sizes and configurations, etcetera, such that receiving sensors may not be effective to determine the signal source location downhole. Therefore, the ranging planner may help operators estimate the signal attenuation in the pipe by modeling the expected field conditions before the actual job is conducted. However, available modeling codes providing a reasonable simulation speed do not consider formation layering in addition to pipe bend effects and completions with multiple pipe sections. Three-dimensional (3D) modeling software can provide this additional information, but is often too slow to render a practical solution for commercial operations, and sometimes fails to render any solution at all (e.g., the solver fails to converge).

To solve this technical problem, a methodology has been developed to simulate a well with a complex pipe structure, by simplifying the structure so that it can be represented by a solid pipe with an effective pipe cross section. The solid pipe can then be treated as a thin wire with behavior that can be analyzed relatively quickly with integral methods. This technique can be used in many applications, such as magnetic ranging and EM telemetry, to help to predict the current flow along the casing, and signal levels at designated receivers. This technique can be also used in vertical or deviated wellbores.

A ranging planner that utilizes this technique may provide the following capabilities: (a) accurately devising a ranging plan (e.g., what type of source should be used at various depths); (b) updating the ranging plan as the well is drilled and new information is acquired; and (c) measuring the distance to the target well, even near the end of the well, by using a calibrated absolute signal.

In well drilling and logging system design, it is often useful to have an estimation of system performance as provided by analytical or numerical modeling. For example, in EM telemetry system design, it is useful to have an idea of the estimated signal level that can be received at the surface based on the tool and environment parameters. Excitation energy can thus be selected, based on the estimate provided. Transmitter, receiver, and repeaters can also be designed and placed, as well as operated, based on the estimate. In another example, it is useful to ensure there is enough current flow down-hole in the target well for ranging applications, to generate a signal with sufficient strength that sensors in the drilling well can reliability detect it. Hence, an estimation of the current distribution along a drilling tool can be useful for designers to predict the feasibility of the system to be chosen, and to select the input power of the source at the surface. A ranging planner with fast modeling capability, as described herein, can be used to predict the signal or current level in real time, as well as in pre-job simulation applications, such as modeling EM telemetry and magnetic ranging system performance.

In an EM telemetry or magnetic ranging system, the borehole and drilling tool usually form a complex profile

Figure 7:
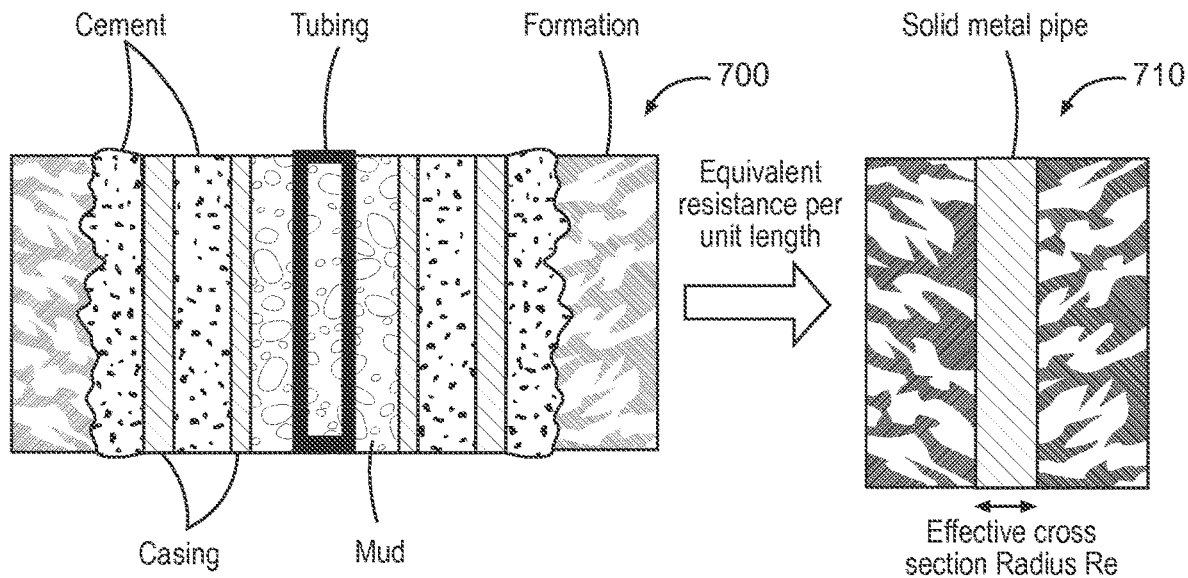

700 along the radial direction, as shown in FIG. 7. Here, the profile 700 includes multiple casings and multiple cement applications, together with tubing and mud. In order to accurately estimate current flow for a down hole magnetic ranging system that operates in this environment, or predict the received signal level at the surface in an EM telemetry system, it is desirable to model the drilling tool with as many tool and environmental parameters as possible (e.g., tube, mud, cement). As mentioned previously, 3D modeling is time consuming. Two-dimensional (2D) modeling may be useful for some wells, when azimuthal symmetry is involved, but 2D modeling is not applicable to deviated wells.

In FIG. 7, an approximation 710 of the complex pipe profile is provided, in the modeled form of a solid pipe with an effective cross section. Thus, the methodology proposed herein can operate to provide an approximation 710: the complex tool is modeled as a simple solid pipe with the same resistance per unit length. This assumes that the most prominent factor affecting the current flow and field distribution on/around the drilling string is the resistance per unit length of the pipe. With an estimated resistance per unit length for complicated well structures, the simplified solid pipe model can provide current and field distribution estimates that are quite close to the original complex tool model.

The simplified model (e.g., the solid pipe with an effective cross section) can then be treated as a thin wire, and analyzed with fast one-dimensional method of moments (MOM) simulation code, which is applicable to both vertical and deviated wells. This can be accomplished by dividing the task into three activities: obtain the resistance per unit length for the original tool structure, derive the effective cross section radius and effective conductivity, and analyze the solid pipe model to obtain the current/field distribution. Each of these activities will now be described in detail.

Figure 8:
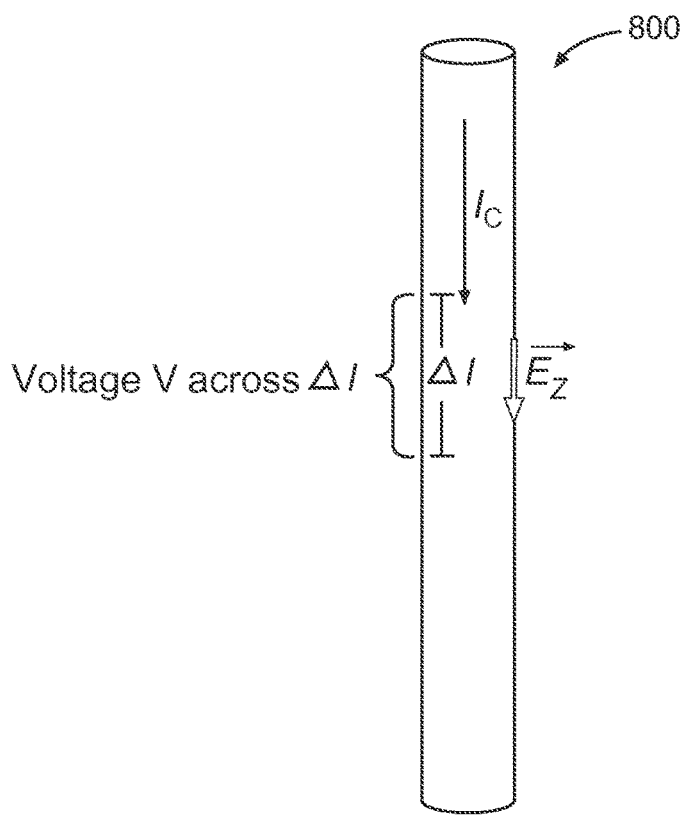

To begin, the resistance per unit length for the original tool structure is obtained. FIG. 8 shows a perspective view of a length of pipe 800 (e.g., a drill string), which is assumed to exist as a cylindrical structure that is infinitely long in the axial direction. Analytic solutions for pipe resistance exist for some simple cases, but the finite-difference, time-domain (FDTD) method is employed here to provide a solution for more complicated radial geometries. The structure of the pipe 800 has both X-Y plane symmetry and azimuthal symmetry, so that the resistance problem can be solved using a one-dimensional method.

Figure 9:
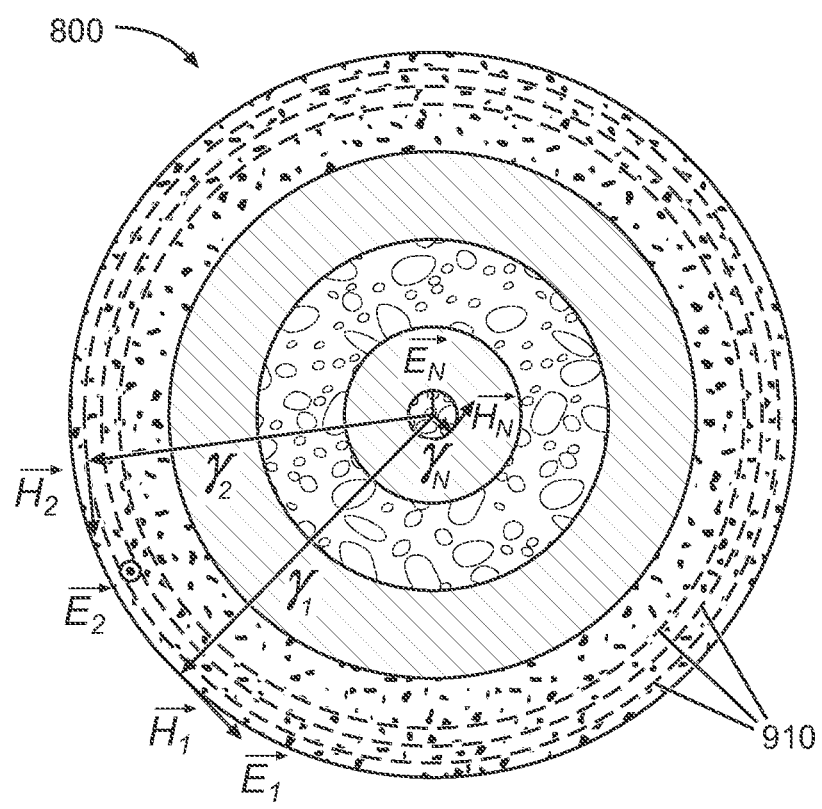

As shown in FIG. 9, the pipe 800 is discretized into concentric cylinders, or FDTD grid elements 910, and the magnetic and electric fields at each discrete point are solved. With these field values, the effective resistance per unit length of the complex model can be obtained. Referring now to FIGS. 8 and 9, it can be seen that a constant current with the value of $I_0$ is assumed to be flowing through the pipe 800. Then, if the potential difference V on a portion of the pipe 800 with length $\Delta l$ is found, the resistance for the pipe section $\Delta l$ is:

$$R = \frac{V}{I_0}.$$

Hence the resistance per unit length of the pipe is $$R_{tool} = \frac{R}{\Delta l} = \frac{V}{I_0 \Delta l} = \frac{E_z}{I_0}.$$

With the voltage on the portion of the pipe $E_z$ calculated using the FDTD process, the resistance per unit length of the pipe $R_{tool}$ can be obtained.

Figure 10:
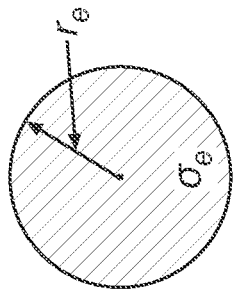
Figure 10:
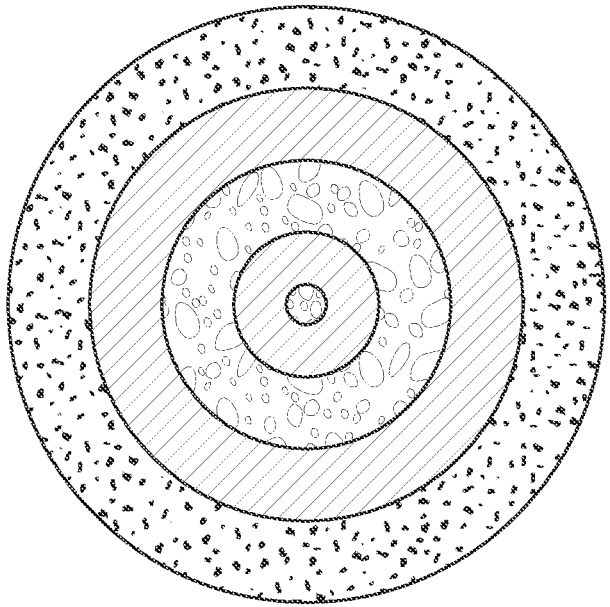

FIG. 10 illustrations the approximation of the original tool with an equivalent solid pipe. Thus, at this point, the effective cross section radius $r_e$ and effective conductivity $\sigma_e$ are derived to achieve the same resistance per unit length $R_{tool}(\Omega/m)$ for the solid pipe model. To obtain the equivalent solid pipe model with same resistance per unit length, an arbitrary conductivity $\sigma_S$ for the solid pipe is chosen.

The resistivity of the solid pipe is $$R_S = \frac{1}{\sigma_e}(\Omega \cdot m).$$

The cross section of the solid pipe can be derived as $$A_e = \frac{R_S}{R_{tool}}(m^2) = \frac{1}{\sigma_e R_{tool}},$$

such that the effective radius of the solid pipe is then determined as $$r_e = \sqrt{\frac{A_e}{\pi}} = \sqrt{\frac{1}{\pi \sigma_e R_{tool}}}.$$

The accuracy of this approximation depends on the relative relationship between the metal skin depth $\delta_S$ and the solid pipe effective radius $r_e$. When $\delta_S \gg r_e$, the accuracy improves, so that the entire solid pipe cross section has current flow. If only part of the cross section has current flow when $\delta_S$ is smaller than $r_e$, the accuracy of the approximation is reduced.

The metal skin depth of the equivalent solid pipe is $$\delta_s = \sqrt{\frac{2}{\pi \sigma_e \mu_0 \mu_r f}}.$$

Since the permeability of the pipe does not change the effective radius, the permeability $\mu_r$ is chosen to maximize the metal skin depth of the solid pipe model. Since ranging and EM telemetry usually operate at very low frequencies (e.g., on the order of 10 Hz), the corresponding metal skin depth tends to satisfy the condition $\delta_S \gg r_e$, so that the approximation used herein provides an accuracy that is more than sufficient for field work at useful operating frequencies. If a higher operating frequency is desired, the accuracy of the approximation may be reduced. However, reasonable results can often be achieved at operating frequencies up to 100 Hz.

Figure 11:
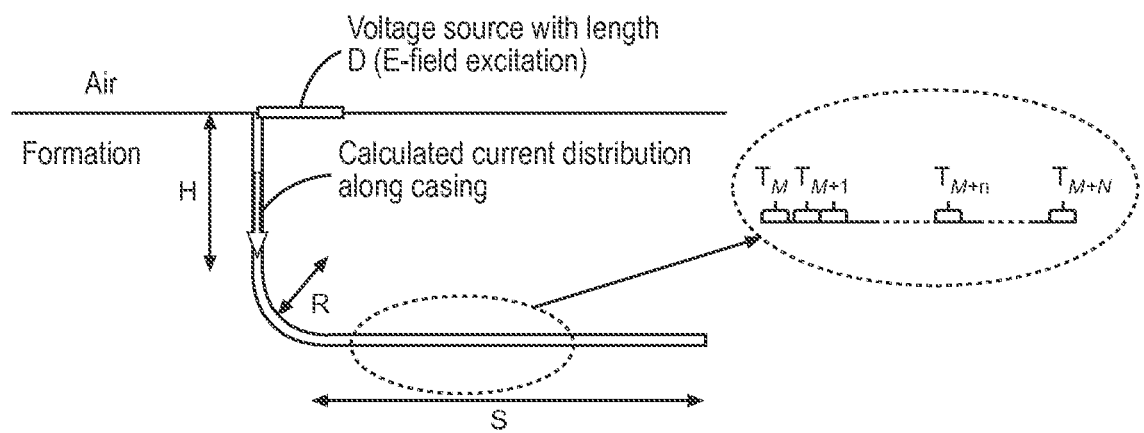
FIGS. 11 to 12 illustrate thin wire modeling of solid pipe according to various embodiments.
Figure 12:
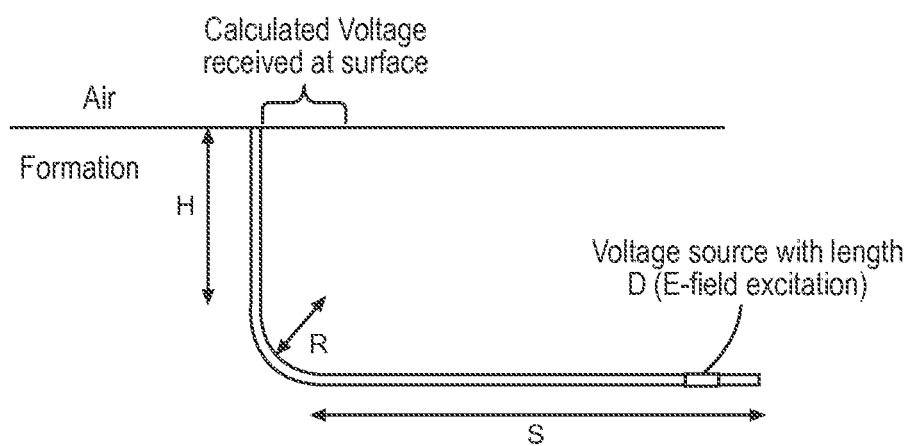
Figure 13:
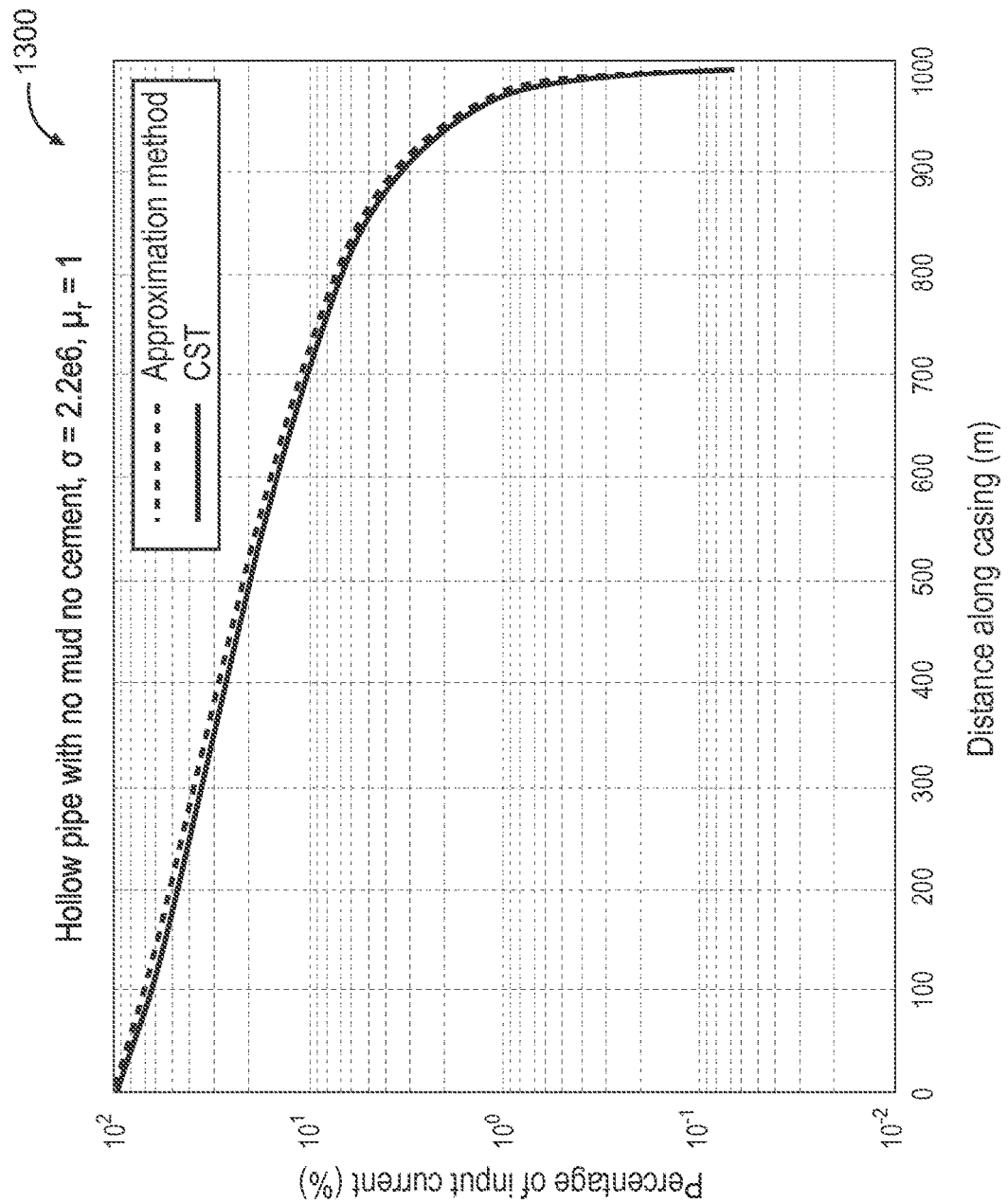
FIGS. 13 to 16 are graphs comparing simulations and approximations according to various embodiments.
Figure 14:
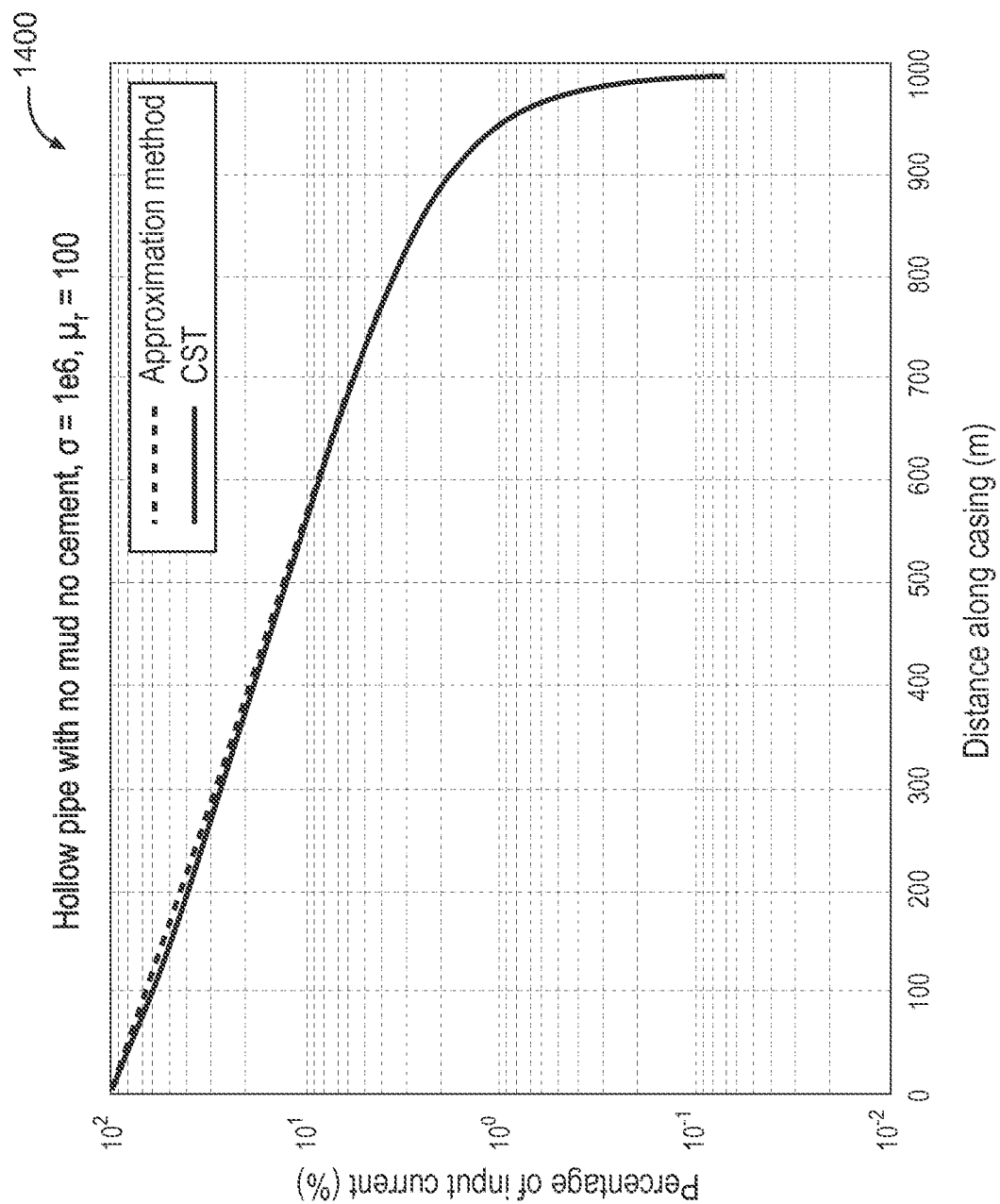
Figure 15:
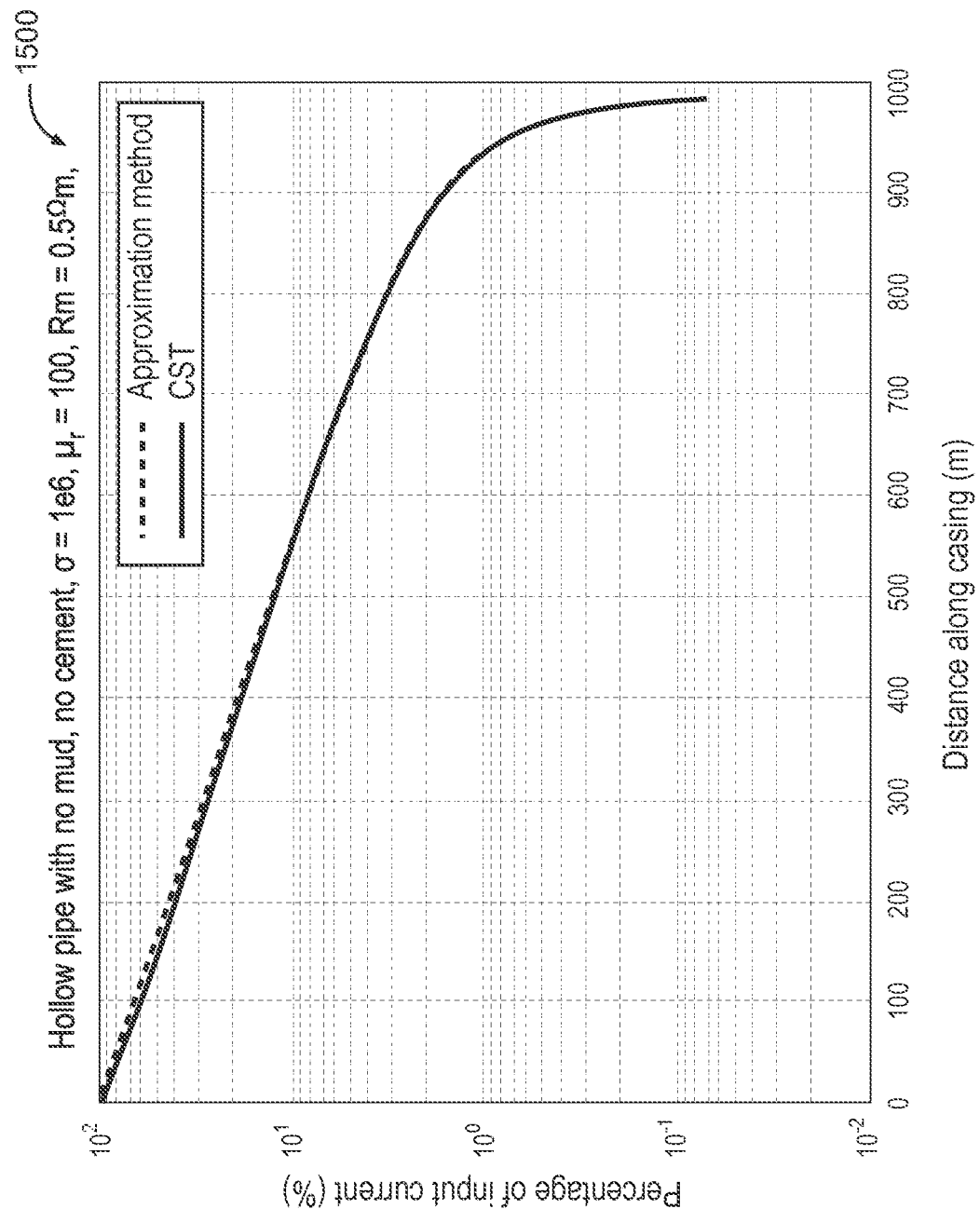
Figure 16:
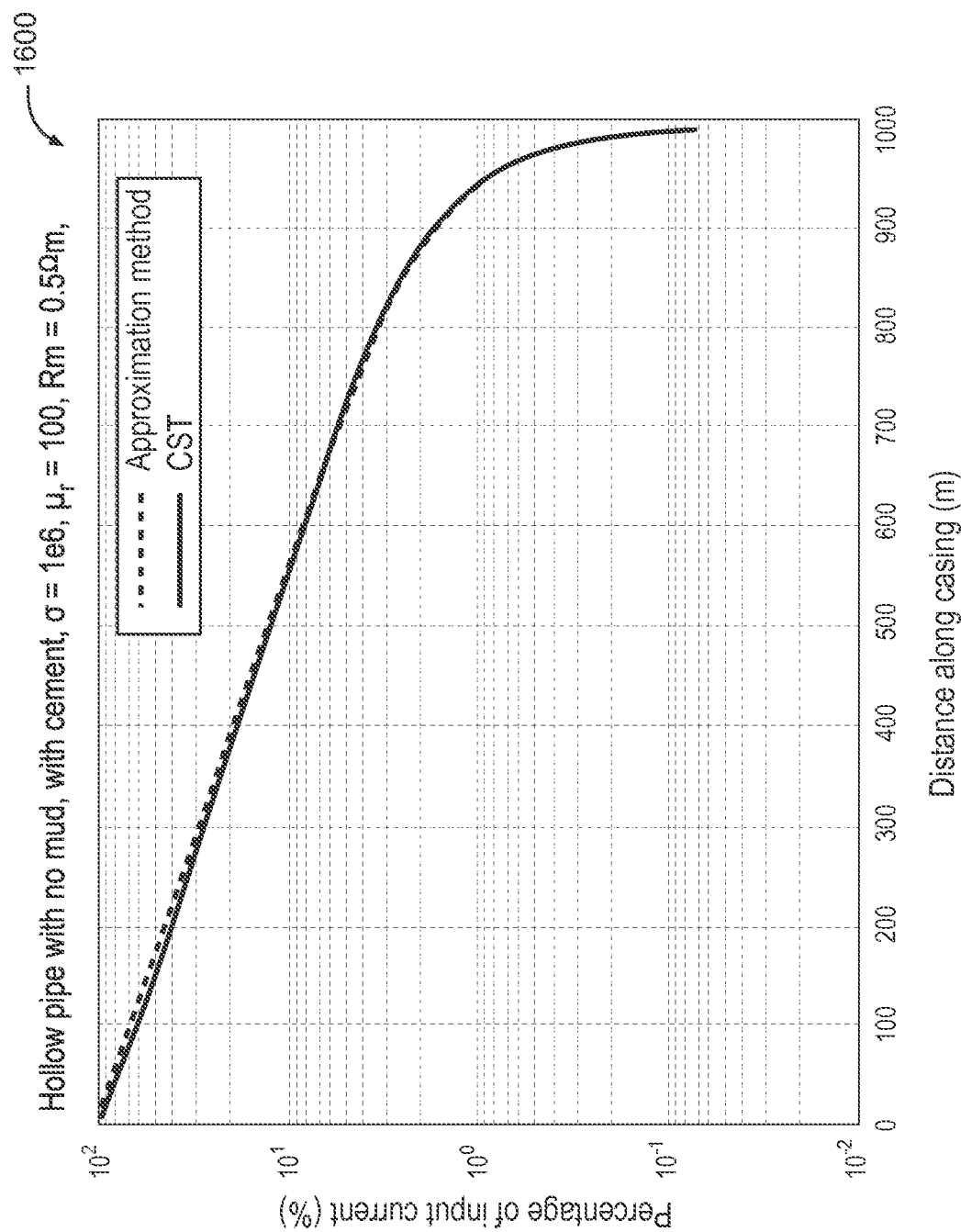

FIGS. 11 to 12 illustrate thin wire modeling of solid pipe according to various embodiments. Here the solid pipe model is analyzed to obtain a current/field distribution, by treating it as a thin wire that is modeled using a one-dimensional MOM algorithm. In this algorithm, the wire is modeled as dipole sections $T_M \ldots T_{M+N}$ that are embedded in a conducting half-space (e.g., a geological formation). An isolation gap with signals applied to the ends of the gap, perhaps using E-field excitation, is modeled as the transmitter.

The transmitter can be placed at the surface of the Earth, as shown in FIG. 11, and connected with the wellhead to model surface excitation for magnetic ranging applications. The current distribution along the target well casing is calculated and the down-hole current level can be estimated for ranging to a second drilling well. The transmitter can also be placed down-hole near the drill bit, as shown in FIG. 12, to model an electrode in an EM telemetry system.

In either case, the voltage at the surface is calculated and the predicted signal level can be used in making system design decisions. By using Green's function for a two layer medium with dipole radiation in the presence of a conducting half-space, the integral equation for the E-field generated by the pipe can be developed. The integral equation array for the E-field at all dipole sections can be discretized into a matrix equation and solved by the MOM algorithm. The current distribution along the drill pipe or the E-field (e.g., voltage) at the surface can then be calculated.

In order to test the model and verify the accuracy of the approximation method described herein, a straight pipe with different pipe structures (with/without mud and cement) was taken as an example. The basic structure of the model can be seen by referring back to FIG. 4.

In this case, a voltage source was placed at the surface between the wellhead and a ground stake 100 m away (instead of 250 m away, as shown in FIG. 4). All other pipe dimensions and material parameters are the same as shown in FIG. 4. The current distribution along the casing was calculated to predict the down hole current level for a magnetic ranging application. The original pipe was modeled using commercial software available from Computer Simulation Technology AG (CST), with its headquarters in Darmstadt, Germany. The CST software simulation results were compared with the MOM results for an equivalent solid pipe, and the outcome of the comparison will now be discussed.

FIGS. 13 to 16 are graphs 1300, 1400, 1500, 1600 comparing simulations and approximations according to various embodiments. As can be seen from the comparison results in these figures, the approximation results provided by the methods described herein (dashed lines) are in agreement with the CST 3D full-wave simulation results (solid lines). This is so, even when the values of steel conductivity σ vary by more than 2:1 and the values of relative permeability $\mu_r$ vary by 100:1 (as between graphs 1300 and 1400), and whether or not cement is present (as between graphs 1500 and 1600). The approximation method can thus achieve accuracy similar to a complete simulation, but in far less time. For example, the approximation algorithm took only a few seconds to simulate equivalent solid pipe activity, while the CST software simulation took about a half an hour, running on the same computer. Thus, the approximation method described herein greatly improves modeling and prediction efficiency, as well as the operation of the computer itself.

In many applications, the pipe profile along the measured depth (MD) may vary due to different layers of casings and changes in the casing materials. The approximation method can accommodate this type of inhomogeneous pipe profile by modeling the profile as a solid pipe with varying conductivities along the measured depth.

Figure 17:
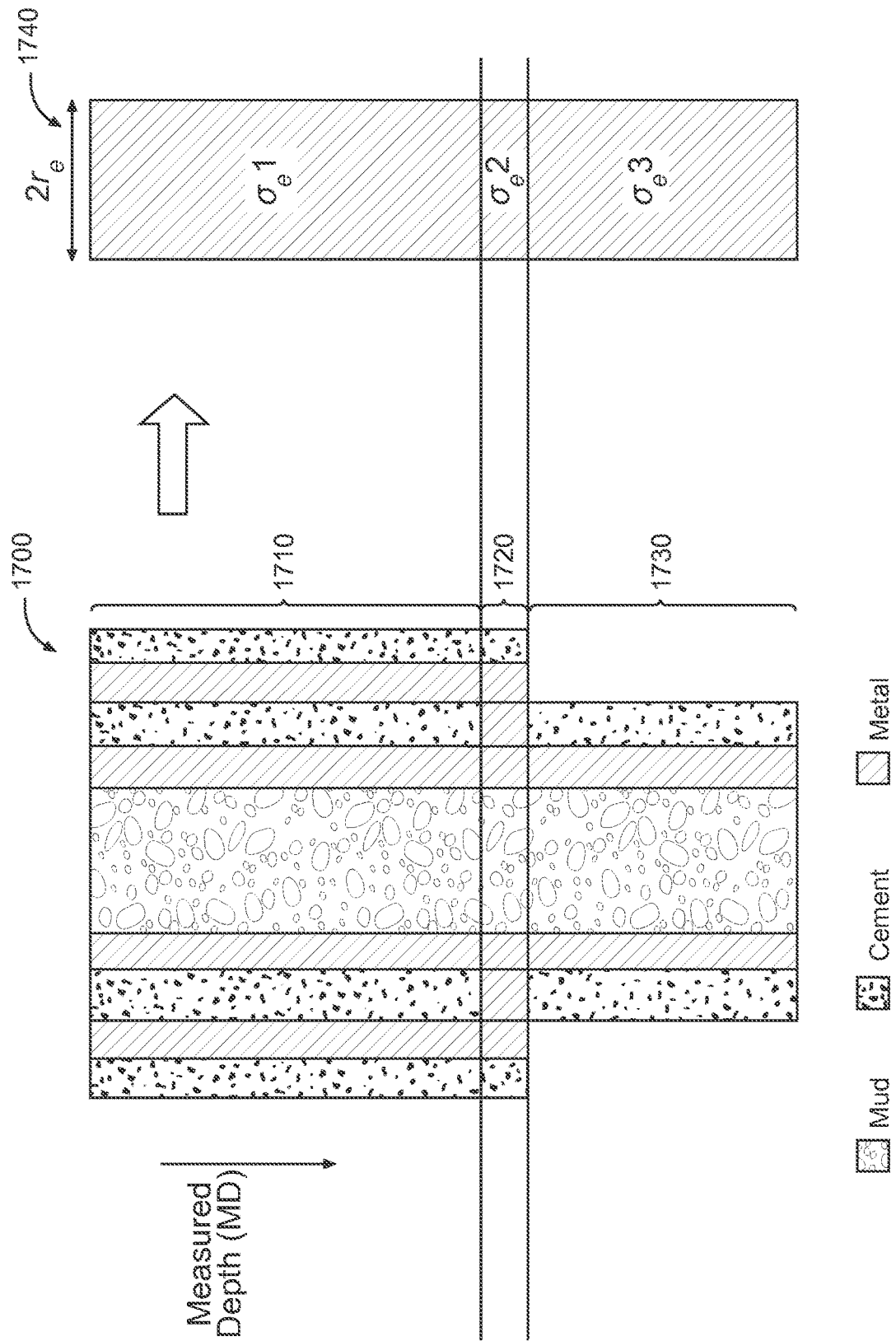
FIGS. 17 to 18 illustrate pipe conversion modeling according to various embodiments.
Figure 18:
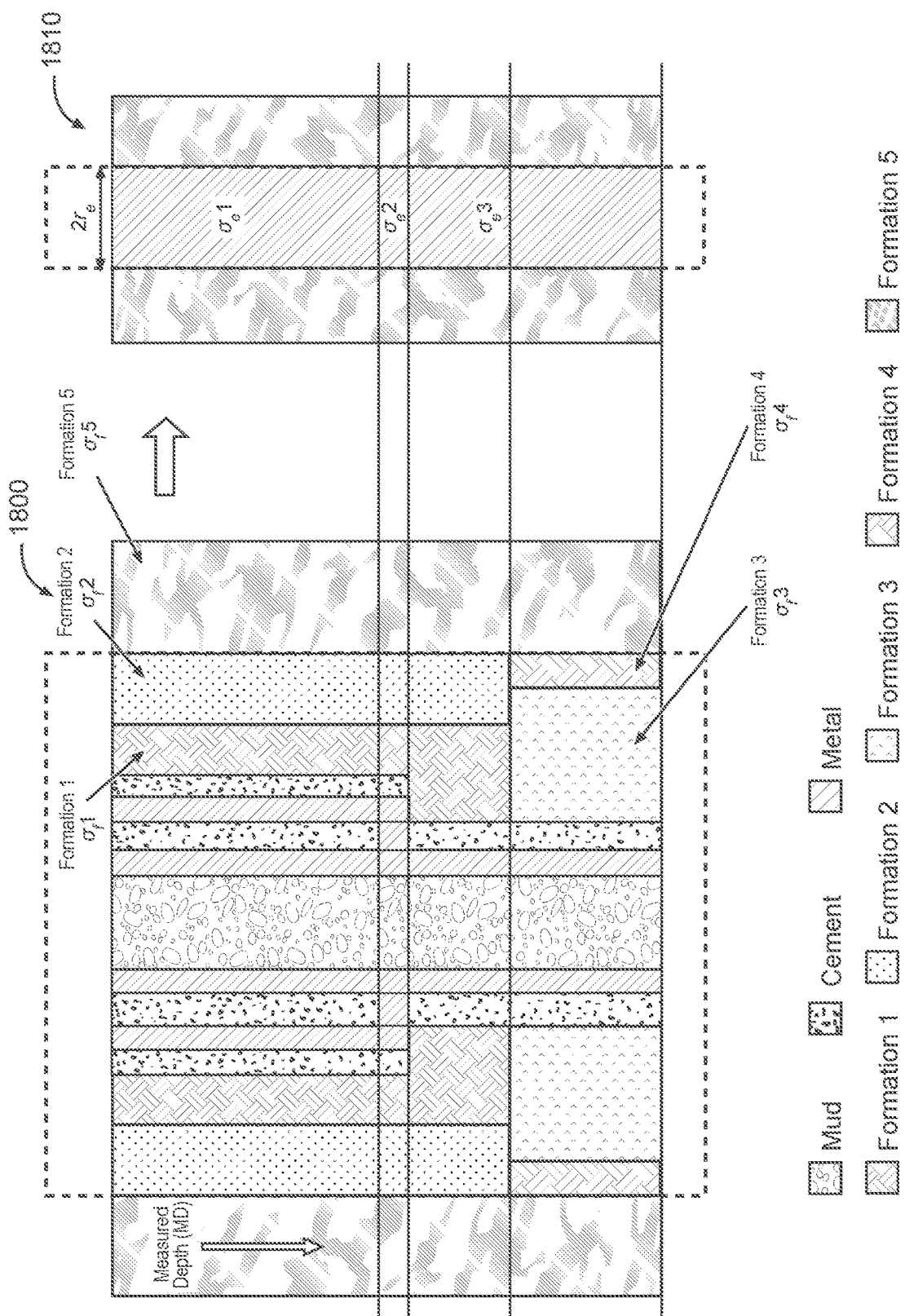

This is shown in FIGS. 17 to 18, which illustrate pipe conversion modeling according to various embodiments. In FIG. 17, a pipe structure profile 1700 with multiple casings is shown. Three different pipe profile sections 1710, 1720, 1730 along the MD are present, using multiple casings and connectors. To model this pipe structure profile 1700, each section i (for i=1 to 3) along the MD is analyzed with finite-difference (FD) method to obtain the resistance per unit length $R_{tool}(i)$. An arbitrary $\sigma_e=1$ is chosen for the first section 1710, and the effective radius $r_e$ is determined. The same value of $r_e$ for the other sections 1720, 1730 is maintained, and the value of $\sigma_e(i)$ for other sections 1720, 1730 is calculated. In this way, a solid pipe model with constant radius and varying conductivity along the measured depth is obtained as the approximation 1740.

For the MOM analysis of the solid pipe model approximation 1740, instead of defining a constant conductivity for the pipe, a conductivity array reflecting the variations in the pipe profile 1700 is defined. Each discretized pipe element (e.g., the sections 1710, 1720, 1730) will then have one conductivity value. The conductivity array is incorporated into the matrix equation and solved using the MOM method.

This method of approximation can be extended to include formations having a radial variation. In that case, for each vertical layer, a formation with zones of radial variation can be treated as part of the tool, and included in the FDTD model as shown in FIG. 18, which illustrates converting the original tool profile 1800, including the surrounding formation into a solid pipe model approximation 1810. This is so, even when the formation has radial variations (e.g., divided into Formation 1, Formation 2, Formation 3, Formation 4, and Formation 5 in the figure, according to conductivity), with an inhomogeneous pipe profile along the MD. The calculated resistance per unit length is then used to derive an equivalent solid cylinder radius in the approximation 1810 in the same way as described previously. For an inhomogeneous pipe profile along the MD (e.g., a pipe having a vertical variation), the effective resistance per unit length can be obtained for each vertical layer as shown in FIG. 18, which is similar to that shown and described for FIG. 17.

By including formation zones of radial and vertical variation in the pipe model approximation 1810, the original inhomogeneous formation problem is converted into a homogeneous formation problem. Hence, the MOM method described above can be used to solve the solid pipe model approximation 1810. A complicated multi-region, Green's function solution is therefore not needed to improve the MOM method when modeling an inhomogeneous medium.

FIGS. 19 to 23 illustrate a variety of methods 1900, 2000, 2100, 2200, 2300, according to various embodiments. When incorporated into the ranging planner modeling scheme, the methods described permit quickly estimating the signal strength surrounding a pipe, without the use of detailed well structures and complicated inhomogeneous formation models. The accuracy of the methods may be reduced when deviated/bent well structures exist, but even so, relatively good estimates for signal strength can be provided—in real time. This allows an operator to understand surface excitation performance for magnetic ranging, and communication performance for EM telemetry application as they are applied in the field.

Figure 19:
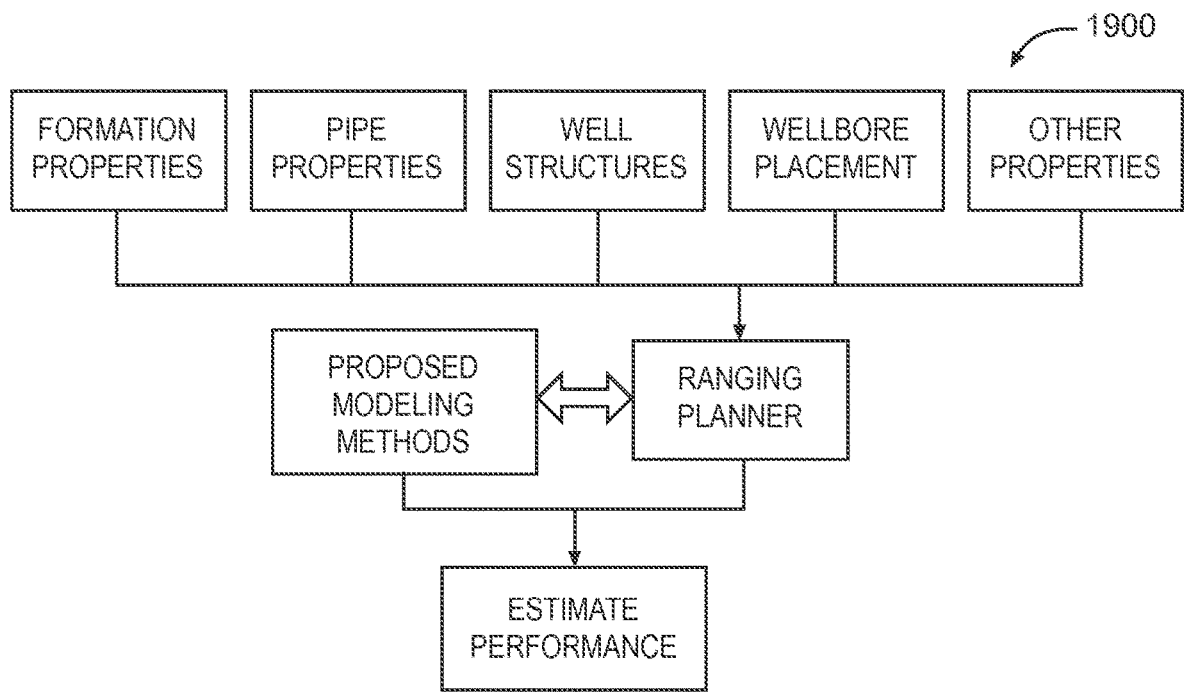
FIGS. 19 to 23 illustrate a variety of methods, according to various embodiments.

One embodiment of the ranging planner processing method is presented in the flow diagram 1900 of FIG. 19. In this case, the method can be integrated with ranging planner software instruction execution, where excitation performance can be simulated prior to running a particular field job with input values comprising formation profiles (which can be estimated from resistivity logs of offset wells and/or the target well), pipe properties (which can be estimated from pipe vendor datasheet), detailed well structures (including mud, cement, and pipe dimensions), wellbore placement, and other properties (e.g., environmental temperature and desired signal strength).

Figure 20:
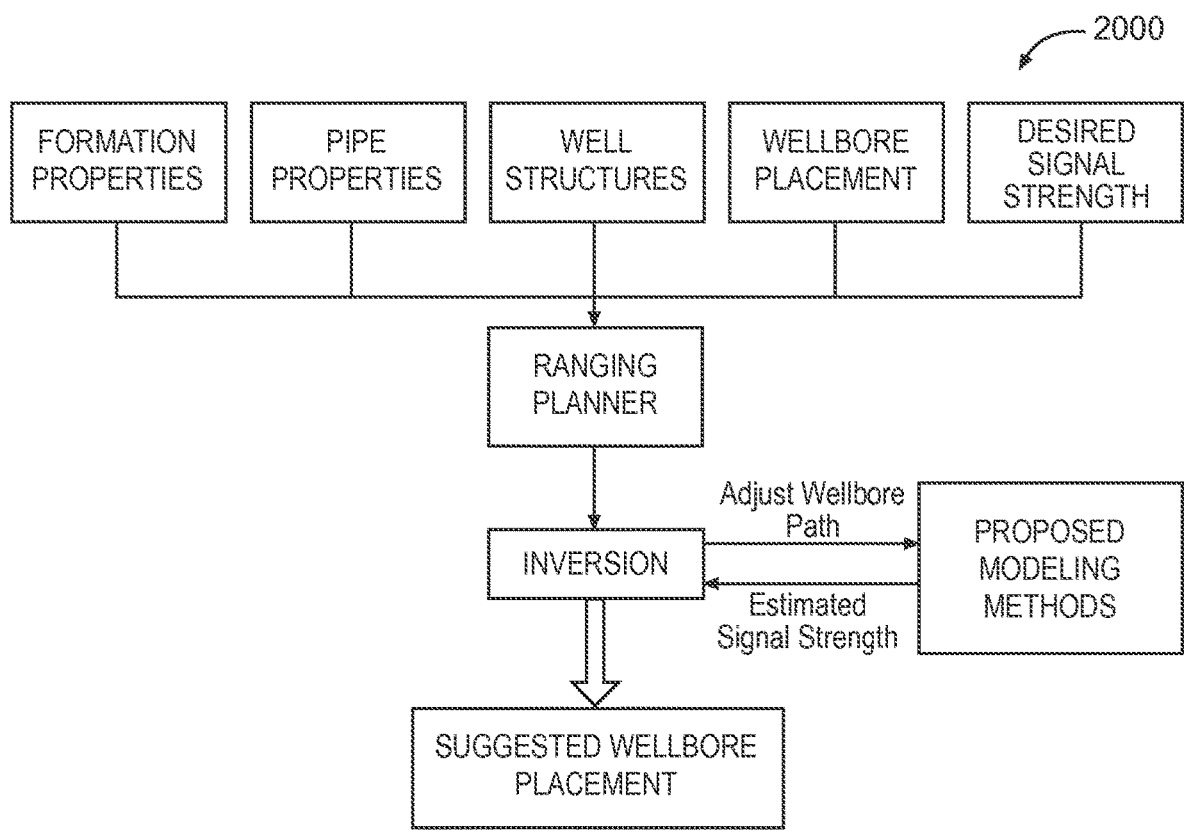

As can be seen in the processing flow diagram 2000 of FIG. 20, in another embodiment of a ranging planner processing method, ranging planner operation can provide improved well placement. In this case, the method 2000 can be executed to determine whether the desired signal strength can be obtained for a particular well before the well is drilled and completed.

Here, known parameter values are entered, including formation properties, pipe properties, pipe total length, mud and cement resistivities, etc. Then, the wellbore placement path, wellbore true vertical depth (TVD), and wellbore measured depth are inverted based on the desired single strength.

Figure 21:
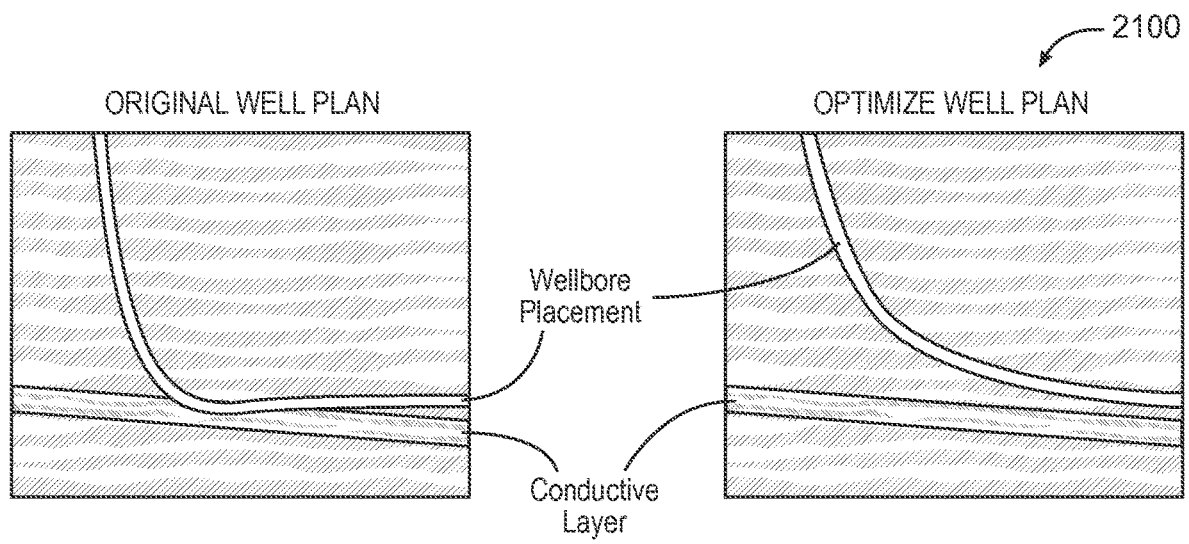

For example, referring now to FIG. 21, it can be seen that the left-hand side of the figure might represent the original wellbore placement for a particular field job. However, due to the existence of conductive formations at certain depths, the signal strength may drop significantly if the wellbore is permitted to penetrate such layers. Consequently, the ranging planner can utilize the proposed fast modeling computation described herein to roughly estimate the signal strength for different drilling paths in the formations, even when radial variations are expected, to provide an improved well placement that delivers the desired signal strength.

The right-hand side of FIG. 21 shows an improved wellbore placement that meets the desired signal performance. It is noted that inversion and fast modeling in the ranging planner can be performed prior to and/or during each field job; that is, the ranging planner can be used for pre-job modeling and/or real-time modeling applications, so that drilling adjustments can be made in real time, as measurements are made and processed according to the various methods described herein.

For real-time modeling, the proposed methods can be calibrated based on real-time measurements, such that input properties can be better adjusted to match with field measurements, with more accurate estimation results. Thus, ranging planner simulation modeling can be calibrated using real-time measurements as shown in the real-time calibration scheme 2200 of FIG. 22. For example, the ranging planner can be operated to provide pre-job modeling based on the best knowledge (or estimate) of all properties to obtain a rough prediction of signal strength as shown by the pre-job modeling solid line in the figure. Then, the ranging planner can utilize downhole sensors measurements in real-time, as shown by the dotted line in the figure, to compare with the pre-job modeling results.

Figure 22:
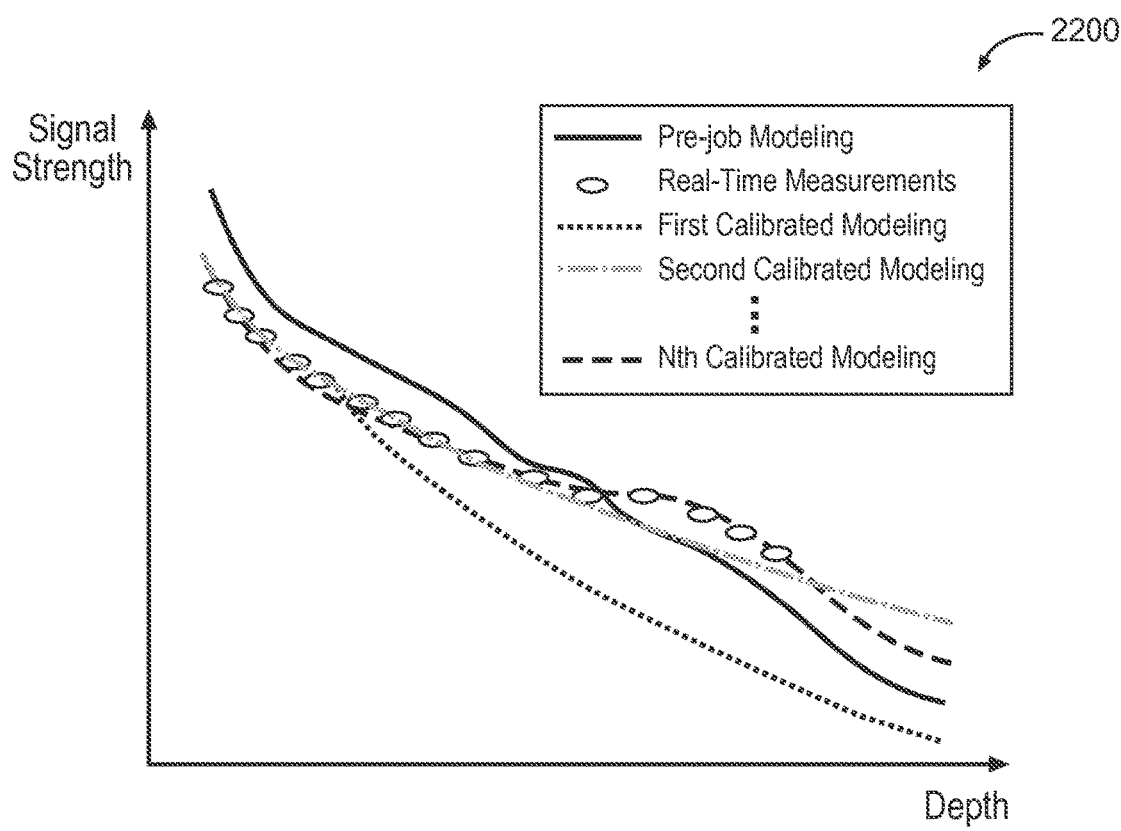

If the properties entered and used to run the pre-job modeling are reasonably accurate, the pre-job modeling results (solid line) should match the measurements (dotted line) made in the field. However, the down hole environment parameters may change over time or distance, and thus, a difference between the modeling results and field measurements may be observed, as seen in the figure. When this occurs, as shown in FIG. 22, the ranging planner can operate to model the underground signal strength by adjusting property values within reasonable ranges to match the field measurements, so that over subsequent measuring cycles (e.g., second calibrated modeling dot-dash line and Nth calibrated modeling dashed line in the figure), the modeled signal strength values will more closely follow actual measurements.

Finally, the ranging planner can operate to predict the underground signal strength for the remainder of the well based on the adjusted property values. Real-time calibration is thus possible, and can be performed multiple times due to the rapid simulation capability described herein. The result is additional improvement for estimates of the underground signal strength.

The ranging planner apparatus, methods, and systems can thus be used to obtain reliable estimates of ranging excitation or telemetry signal strength, prior to conducting field operations. Embodiments of the ranging planner can also operate to update environmental parameters in real-time, based on data acquired in the field, to give operators an indication as to when unexpected situations might develop, and a better idea of the signal strength to be expected as drilling continues to greater depths. Other method embodiments may be realized.

Figure 23:
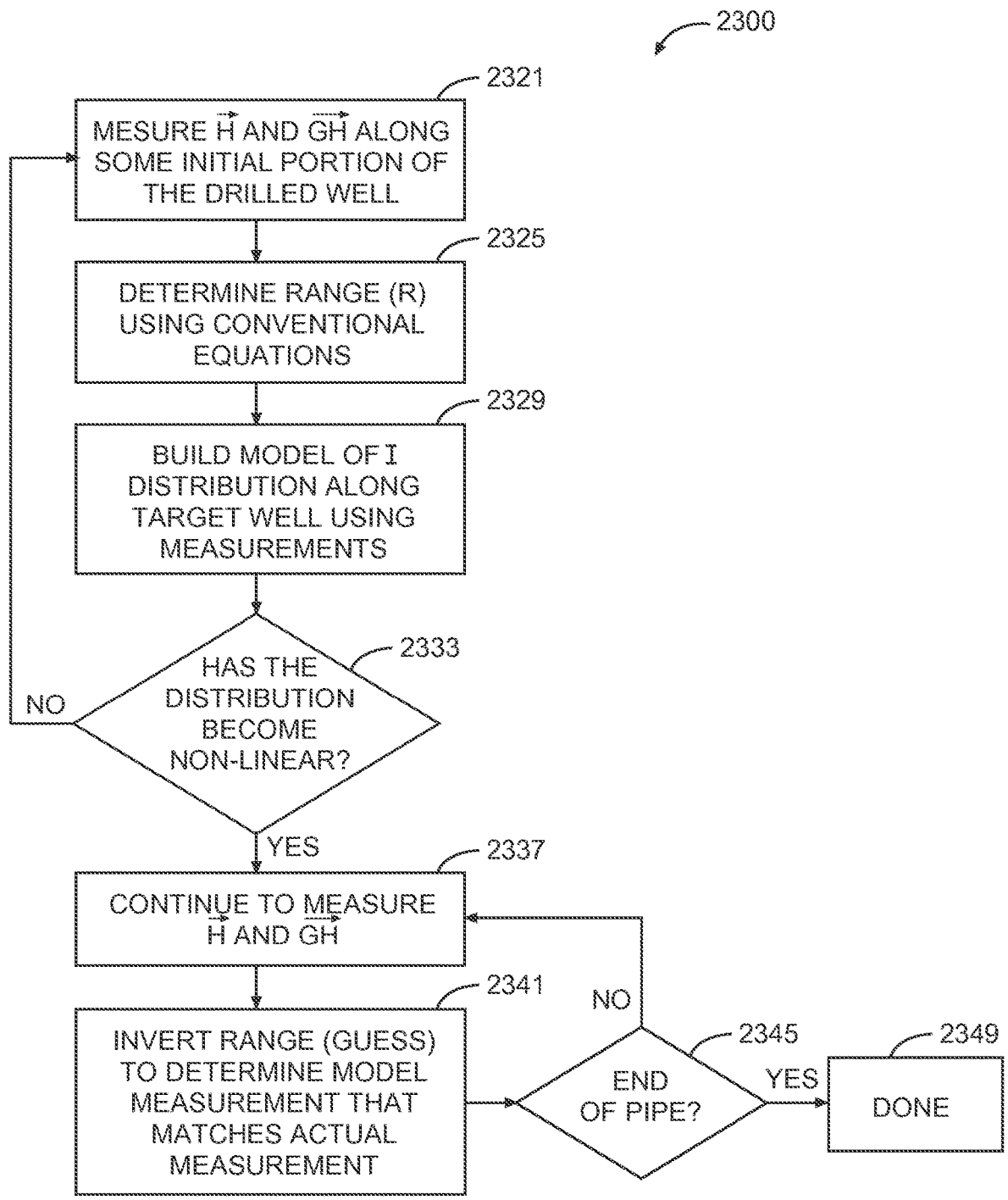

For example, FIG. 23 illustrates a method 2300 of measurement and adjustment according to various embodiments. At block 2321, the method 2300 comprises measuring a total electromagnetic field value, and a field gradient, as a set of measurements along an initial portion of a drilling well, of an electromagnetic field originating at a target well due to direct transmission or backscatter transmission At block 2325, the method 2300 comprises determining an approximate range between the drilling well and the target well using field equations (e.g., Equation (3) and the set of measurements). At block 2329, the method 2300 comprises repeating the measuring and determining at blocks 2321 and 2325 at increasing depths along the drilling well to build a model of current distribution along the target well, using the set of measurements obtained during each instance of the measuring (while the current distribution remains linear, as determined at block 2333).

At block 2333, when a comparison of a measurement predicted by the model to at least one component in the set of measurements indicates nonlinearity in the current distribution (i.e., the end of pipe effect is prominent, perhaps determined by comparing model results to the results of field calculations at block 2325, to determine whether the difference between the modeled results and the field calculations exceeds a selected threshold), the method 2300 operates to switch from using the conventional calculations at block 2325, which are now considered to be unreliable, to using the model to determine the range.

This part of the method 2300 comprises continued measurement of the total electromagnetic field value and the field gradient at block 2337, and then inverting the approximate range to determine a model response that matches the set of measurements at block 2341. After inversion, the model response (i.e., inverted range) is used in place of at least one component in the set of measurements to determine an actual range, as a substitute for the approximate range, which would have been calculated as part of the method 2300 that includes block 2325.

At blocks 2345 and 2349, the method 2300 is shown to include continuing the measuring and the inverting at blocks 2337 and 2341, respectively, until the increasing depths reach an end of casing material in the drilling well. The method 2300 then terminates at block 2349.

Additional Detailed Description and Some Representative Embodiments

Figure 24:
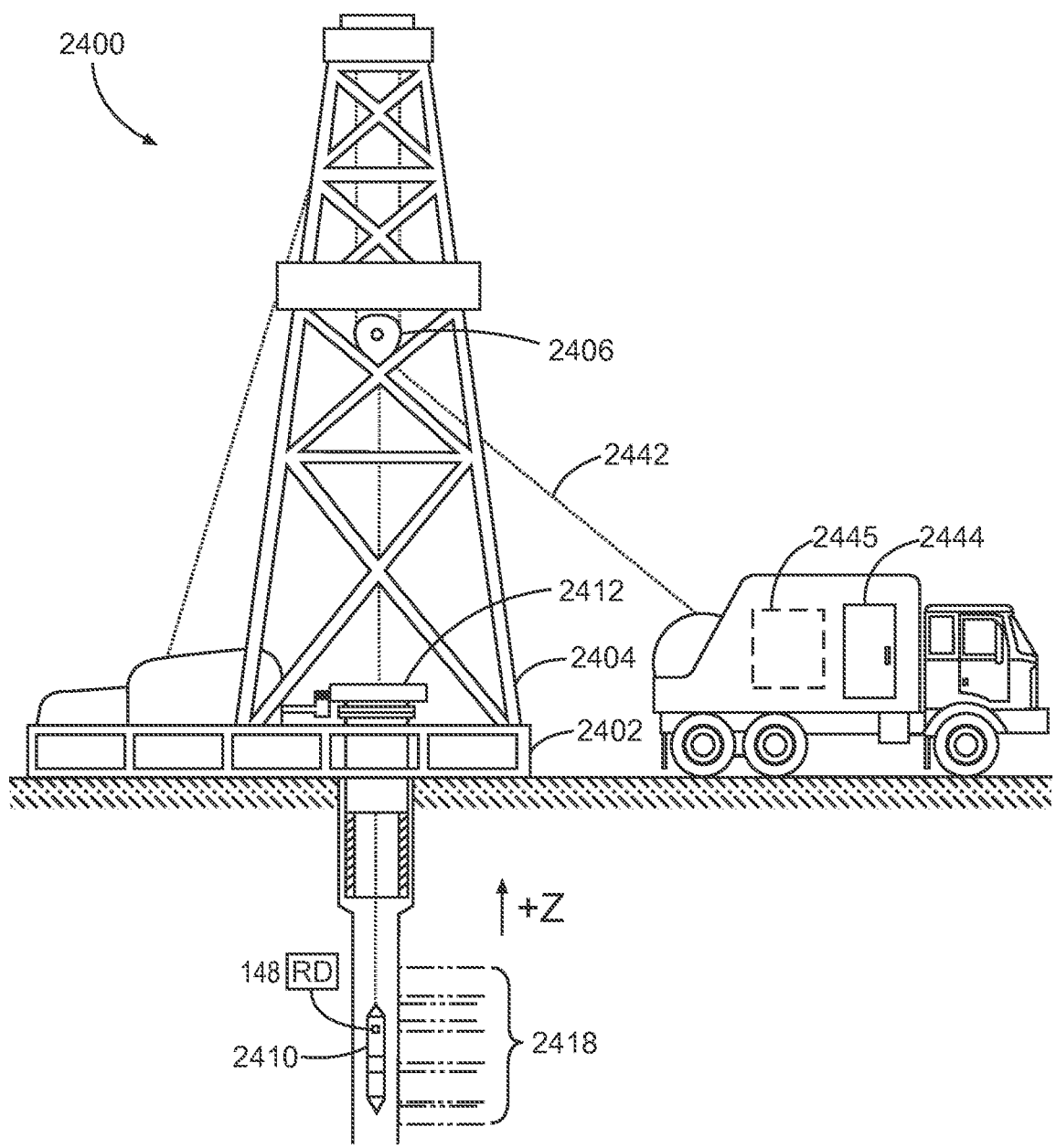
FIG. 24 is a block diagram of a wireline system implementation of various embodiments.

FIG. 24 is a block diagram of a wireline system 2400 implementation of various embodiments. The system 2400 of FIG. 24 may include any of the embodiments of receiver or sensor mounting discussed previously. In this case, a hoist 2406 may be included as a portion of a platform 2402, such as coupled to a derrick 2404, and used to raise or lower equipment such as a wireline sonde 2410 into or out of a borehole. The wireline sonde 2410 may include any one or more of the above-described embodiments, including sensors and a range determination module RD.

In this wireline example, a cable 2442 may provide a communicative coupling between a logging facility 2444 (e.g., including a processor circuit 2445 including memory or other storage or control circuitry) and the sonde 2410. In this manner, information about the formation 2418 may be obtained. The processor circuit 2445 can be configured to access and execute instructions stored in a memory to implement any of the methods described herein (e.g., by accessing a range determination module RD).

Figure 25:
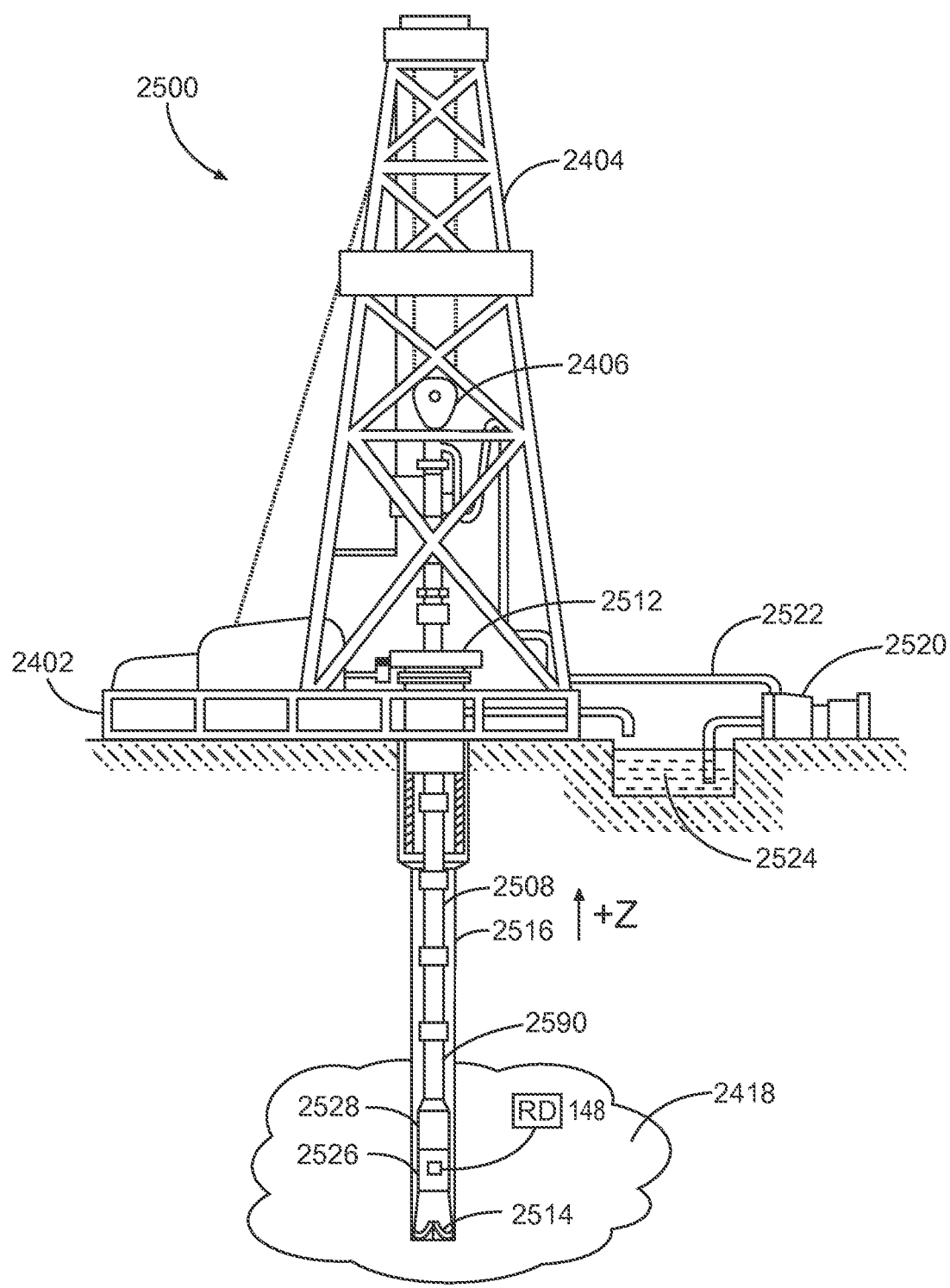
FIG. 25 is a block diagram of a drilling system implementation of various embodiments.

FIG. 25 is a block diagram of a drilling system 2500 implementation of various embodiments. This diagram shows a drilling rig system 2500 according to various embodiments that may include measurement while drilling (MWD) or logging while drilling (LWD) capability. The drilling apparatus can use data from an insert in the drill string 2508, having attached to a number of receivers or sensors as discussed previously, and using acquired and calculated ranging information to steer the drill bit 2514.

A drilling rig or platform 2402 generally includes a derrick 2404 or other supporting structure, such as including or coupled to a hoist 2406. The hoist 2406 may be used for raising or lowering equipment or other apparatus such as drill string 2508. The drill string 2508 may access a borehole 2516, such as through a well head 2512. The lower end of the drill string 2508 may include various apparatus, such as a drill bit 2514, such as to provide the borehole 2516.

A drilling fluid or "mud" may be circulated in the annular region around the drill bit 2514 or elsewhere, such as provided to the borehole 2516 through a supply pipe 2522, circulated by a pump 2520, and returning to the surface to be captured in a retention pit 2524 or sump. Various subs or tool assemblies may be located along the drill string 2508, such as a bottom hole assembly (BHA) 2526 or a second sub 2528. The BHA 2526 and/or the sub 2528 may include one or more sensors or receivers, as described herein, along with a current source (e.g., power supply 148) to initiate a ranging signal, and a processor with access to a memory that contains a program to implement any of the methods described herein (e.g., a ranging determination module RD).

Thus, some of the embodiments described herein may be realized in part, as a set of instructions on a computer readable medium 142 comprising ROM, RAM, CD, DVD, hard drive, flash memory device, or any other computer readable medium, now known or unknown, that when executed causes a computing system, such as computer as illustrated in FIG. 1 or some other form of a data processing device 140, to implement portions of a method of the present disclosure, for example the processes and methods described in FIGS. 3, 6-7, 9-12, and 17-23 (e.g., for computer-assisted well completion).

Though sometimes described serially in the examples of FIGS. 3, 6-7, 9-12, and 17-23, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

It is expected that the system range and performance can be extended with the various embodiments described herein. Power can often be saved, and accuracy of ranging measurements improved. Signal components may be extracted and converted to pixel colors or intensities and displayed as a function of tool position and azimuth. Assuming the target casing string is within detection range, it may appear as a bright (or, if preferred, a dark) band in the image. The color or brightness of the band may indicate the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

While the text of this document has been divided into sections, it should be understood that this has been done as a matter of convenience, and that the embodiments discussed in any one section may form a part of any or more embodiments described in another section, and vice-versa. Moreover, various embodiments described herein may be combined with each other, without limitation. Thus, many embodiments may be realized. Some of these will now be listed in a non-limiting fashion.

In some embodiments, a method of range determination comprises measuring a total electromagnetic field value, and a field gradient, as a set of measurements along an initial portion of a drilling well, of an electromagnetic field originating at a target well due to direct transmission or back-scatter transmission. The method may further comprise determining an approximate range between the drilling well and the target well using field equations and the set of measurements; repeating the measuring and determining at increasing depths along the drilling well to build a model of current distribution along the target well, using the set of measurements obtained during each instance of the measuring; and when a comparison of a measurement predicted by the model to at least one component in the set of measurements indicates nonlinearity in the current distribution, inverting the approximate range to determine a model response that matches the set of measurements, using the model response in place of at least one component in the set of measurements to determine an actual range to substitute for the approximate range.

In some embodiments, the method comprises continuing the measuring and the inverting until the increasing depths reach an end of casing material in the drilling well.

In some embodiments, the method comprises determining that the comparison indicates nonlinearity when a selected threshold is exceeded.

In some embodiments, the method comprises continuing the measuring when the comparison does not indicate nonlinearity.

In some embodiments, the at least one component comprises one or more of a total field measurement or a gradient field measurement. In some embodiments, the current distribution comprises a normalized current distribution along the target well, as a ratio of calculated current at each of the depths to surface current at a wellhead of the target well.

In some embodiments, building the model of the current distribution comprises modeling the target well using a solid pipe approximation. In some embodiments, building the model of the current distribution comprises modeling the target well using a thin wire approximation. In some embodiments, building the model of the current distribution comprises modeling a formation surrounding the target well and the target well using a solid pipe approximation.

In some embodiments, the method comprises estimating signal strength associated with the electromagnetic field surrounding the solid pipe in real time, as an indication of surface excitation performance for magnetic ranging and/or communication performance for electromagnetic telemetry.

In some embodiments, using the model response to determine the actual range comprises calculating the actual range determined by a fit between sensor field measurements and modeling output data.

In some embodiments, the model comprises initiating the inverting as inversion activity prior to determining existence of the nonlinearity.

In some embodiments, the model comprises calibrating a modeled version of signal strength associated with the electromagnetic field by adjusting down hole environment parameters to provide adjusted parameters so that the modeled version matches the set of measurements.

In some embodiments, the model comprises predicting the signal strength along a remainder of the drilling well based on the adjusted parameters.

In some embodiments, as shown in FIGS. 1, 24, and 25, an apparatus comprises a down hole tool housing attached to a set of sensors, the down hole tool housing comprising one or more of a bottom hole assembly, a drill collar, a drill string pipe, or a sub. The apparatus may further comprise a processor (e.g., computer 140 or range determination module RD) communicatively coupled to the set of sensors to receive electromagnetic signal strength signals as a set of measurements from the sensors, and to a memory. The memory may include a set of instructions which, when executed by the processor, cause the processor to implement a method comprising determining an approximate range between a drilling well and a target well using field equations and the set of measurements, repeatedly receiving the signals and determining the approximate range at increasing depths along the drilling well to build a model of current distribution along the target well, and when a comparison of a measurement predicted by the model to at least one component in the set of measurements indicates nonlinearity in the current distribution, inverting the approximate range to determine a model response that matches the set of measurements, using the model response in place of at least one component in the set of measurements to determine an actual range to substitute for the approximate range.

Thus, in some embodiments, the processor comprises a ranging determination module RD disposed in the down hole tool housing. In some embodiments, the processor comprises a ranging determination module RD disposed in a surface computer.

In some embodiments, as shown in FIG. 1, a system comprises a source of current or voltage (e.g., a power supply 148) to electrically couple to a well casing of a first well or to attach to a first down hole tool housing. The system may further comprise a drill string to be disposed in a second well and mechanically coupled to a second down hole tool housing, the second down hole tool housing attached to a set of sensors. The system may also comprise a processor communicatively coupled to the set of sensors to receive signals representing electromagnetic field strength from the sensors, in response to the source exciting the well casing directly to initiate direct signal transmission, or indirectly via backscatter transmission, the processor communicatively coupled to a memory having a set of instructions which, when executed by the processor, cause the processor to implement a method comprising determining an approximate range between a drilling well and a target well using field equations and the set of measurements, repeatedly receiving the signals and determining the approximate range at increasing depths along the drilling well to build a model of current distribution along the target well, and when a comparison of a measurement predicted by the model to at least one component in the set of measurements indicates nonlinearity in the current distribution, inverting the approximate range to determine a model response that matches the set of measurements, using the model response in place of at least one component in the set of measurements to determine an actual range to substitute for the approximate range.

In some embodiments of the system, the source of current or voltage (e.g., a power supply 148) is coupled to the well casing of the first well via a well head of the first well. In some embodiments of the system, the source of current or voltage is attached to the first down hole tool housing near a drill bit.

In some embodiments, an apparatus comprises a down hole tool housing (e.g., ranging tool 124) attached to a set of sensors, the down hole tool housing comprising one or more of a wireline sonde, a bottom hole assembly, a drill collar, a drill string pipe, or a sub. Some embodiments of this apparatus further comprise a processor (e.g., computer 140) communicatively coupled to the set of sensors to receive electromagnetic signal strength signals from the sensors, and to a memory (e.g., medium 142), the memory having a set of instructions which, when executed by the processor, cause the processor to implement any of the methods described herein.

In some embodiments, a system comprises a source of current or voltage (e.g., power supply 148) to electrically couple to a well casing of a first well or to attach to a first down hole tool housing. Some embodiments of this system further comprise a drill string to be disposed in a second well and mechanically coupled to a second down hole tool housing, the second down hole tool housing attached to a set of sensors. Some embodiments of this system further comprise a processor (e.g., computer 140) communicatively coupled to the set of sensors to receive signals representing electromagnetic field strength from the sensors, in response to the source exciting the well casing directly to initiate direct signal transmission, or indirectly via backscatter transmission, the processor communicatively coupled to a memory (e.g., medium 142) having a set of instructions which, when executed by the processor, cause the processor to implement any of the methods described herein.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation (as shown in FIG. 24). It is intended that the following claims be interpreted to embrace all such variations and modifications.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of the knowledge provided by this disclosure. Thus, the present disclosure includes a variety of combinations and/or integrations of the embodiments and examples described herein, as well as further embodiments and examples, as defined within the scope of all claims based on this disclosure, as well as all legal equivalents of such claims.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method, comprising:
    inducing an activation current in a target well casing of a target well;
    measuring a total electromagnetic field value and a field gradient value, as a set of measurement values along an initial portion of a drilling well, of an electromagnetic field induced at the target well by the activation current;
    determining an approximate range between the drilling well and the target well using field equations that apply the set of measurement values;
    repeating the measuring and the determining at increasing depths along the drilling well to adjust ranging model input parameters for building a model of current distribution along the target well, using the set of measurement values obtained during each instance of the measuring; and
    during said repeating the measuring and the determining, and in response to determining that a current distribution is nonlinear based on a comparison of a measurement predicted by the model to at least one component in the set of measurement values,
    inverting the determined approximate range to determine a model response that matches the set of measurement values;
    determining an actual range to substitute for the determined approximate range based on replacing at least one component in the set of measurement values with the model response; and
    substituting the actual range for the determined approximate range.

2. The method of claim 1, wherein the at least one component comprises at least one of the total electromagnetic field value and the field gradient value.

3. The method of claim 1, wherein the current distribution comprises a normalized current distribution along the target well, as a ratio of calculated current at each of the depths to a surface current at a wellhead of the target well.

4. The method of claim 1, wherein building the model of the current distribution comprises:
    modeling the target well using a solid pipe approximation.

5. The method of claim 4, wherein building the model of the current distribution comprises:
    modeling the target well using a thin wire approximation.

6. The method of claim 1, wherein building the model of the current distribution comprises:
    modeling a formation surrounding the target well and the target well using a solid pipe approximation.

7. The method of claim 6, further comprising:
    estimating a signal strength associated with an electromagnetic field surrounding the solid pipe approximation in real time, as an indication of surface excitation performance for at least one of magnetic ranging and communication performance for electromagnetic telemetry.

8. The method of claim 1, wherein determining the actual range comprises:
    calculating the actual range by a fit between sensor field measurements and modeling output data.

9. The method of claim 1, further comprising:
    initiating the inverting as an inversion activity prior to determining existence of nonlinearity in the current distribution.

10. The method of claim 1, further comprising:
    calibrating a modeled version of signal strength associated with the electromagnetic field by adjusting downhole environment parameters to provide adjusted parameters so that the measurement predicted by the model matches the set of measurement values.

11. The method of claim 10, further comprising:
    predicting the signal strength along a remainder of the drilling well based on the adjusted parameters.

12. The method of claim 1, further comprising:
    adjusting a drilling operation of the drilling well.

13. The method of claim 1, further comprising locating the drilling well based on the actual range.

14. An apparatus, comprising:
    a downhole tool housing attached to a set of sensors, the downhole tool housing
        comprising at least one of a bottom hole assembly, a drill collar, a drill string pipe, and a sub;
    an electrical source coupled to a target well casing of a target well, the electrical source to induce an activation current in the target well casing; and
    a processor communicatively coupled to receive from the set of sensors signal strength of an electromagnetic field induced at the target well by the activation current as a set of measurement values along an initial portion of a drilling well, the processor further communicatively coupled to a memory, the memory having a set of instructions which, when executed by the processor, cause the processor to,
        determine an approximate range between the drilling well and the target well using field equations that apply the set of measurement values,
        repeatedly determine approximate range values based, at least in part, on using the field equations that apply sets of measurement values obtained from repeated sensor measurements performed at increasing depths along the drilling well to adjust ranging model input parameters for building a model of current distribution along the target well, and
        during said repeatedly determine approximate range values, and in response to a determination that a current distribution is nonlinear based on a comparison of a measurement predicted by the model to at least one component in the set of measurement values,
            invert the determined approximate range to determine a model response that matches the set of measurement values;
            determine an actual range to substitute for the determined approximate range based on a replacement of at least one component in the set of measurement values with the model response; and
substitute the actual range for the determined approximate range.

15. The apparatus of claim 14, wherein the set of instructions which, when executed by the processor, further cause the processor to:
adjust a drilling operation of the drilling well based on the actual range.

16. The apparatus of claim 14, wherein the set of instructions which, when executed by the processor, further cause the processor to locate the drilling well based on the actual range.

17. A system, comprising:
an electrical source that is electrically coupled to a well casing of a target well and to a first downhole tool housing, the electrical source to induce an activation current;
a drill string to be disposed in a drilling well and mechanically coupled to a second downhole tool housing, the second downhole tool housing attached to a set of sensors; and
a processor communicatively coupled to the set of sensors to receive from the set of sensors a set of measurement values representing electromagnetic field strength of an electromagnetic field induced by the activation current, the processor communicatively coupled to a memory having a set of instructions which, when executed by the processor, cause the processor to,
determine an approximate range between the drilling well and the target well using field equations that apply the set of measurement values,
repeatedly determine approximate range values based, at least in part, on using the field equations that apply sets of measurement values obtained from repeated sensor measurements performed at increasing depths along the drilling well to adjust ranging model input parameters for building a model of current distribution along the target well, and
during said
repeatedly determine approximate range values, and in response to a determination that a current distribution is nonlinear based on a comparison of a measurement predicted by the model to at least one component in the set of measurement values,
invert the determined approximate range to determine a model response that matches the set of measurement values;
determine an actual range to substitute for the determined approximate range based on a replacement of at least one component in the set of measurement values with the model response; and
substitute the actual range for the determined approximate range.

18. The system of claim 17, wherein the electrical source is coupled to the well casing of the target well via a well head of the first well.

19. The system of claim 17, wherein the set of instructions which, when executed by the processor, further cause the processor to:
adjust a drilling operation of the drilling well based on the actual range.

20. The system of claim 17, wherein the set of instructions which, when executed by the processor, further cause the processor to locate the drilling well based on the actual range.

* * * * *